United States Patent
Yamanoue

(10) Patent No.: US 6,745,180 B2
(45) Date of Patent: Jun. 1, 2004

(54) DATA SUPPLY CONTROLLING DEVICE, METHOD, AND STORAGE MEDIUM WHICH FACILITIES INFORMATION SEARCHING BY USER

(75) Inventor: Masafumi Yamanoue, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 316 days.

(21) Appl. No.: 09/976,048

(22) Filed: Oct. 15, 2001

(65) Prior Publication Data

US 2002/0103806 A1 Aug. 1, 2002

(30) Foreign Application Priority Data

Oct. 18, 2000 (JP) ........................................ 2000-318318

(51) Int. Cl.[7] .............................................. G06F 17/30
(52) U.S. Cl. ....................... 707/3; 707/2; 707/4; 707/5; 707/6
(58) Field of Search ............................. 707/2, 3, 4, 5, 707/6

(56) References Cited

U.S. PATENT DOCUMENTS

| | | | | |
|---|---|---|---|---|
| 5,519,859 A | * | 5/1996 | Grace ............................. | 707/3 |
| 5,632,015 A | * | 5/1997 | Zimowski et al. .............. | 707/3 |
| 5,864,841 A | * | 1/1999 | Agrawal et al. ................ | 707/2 |
| 6,148,296 A | * | 11/2000 | Tabbara .......................... | 707/3 |
| 6,366,910 B1 | * | 4/2002 | Rajaraman et al. ............. | 707/5 |
| 2001/0047355 A1 | * | 11/2001 | Anwar ............................ | 707/5 |
| 2002/0194167 A1 | * | 12/2002 | Bakalash et al. ............... | 707/3 |
| 2003/0163466 A1 | * | 8/2003 | Rajaraman et al. ............. | 707/6 |

FOREIGN PATENT DOCUMENTS

| | | | | |
|---|---|---|---|---|
| EP | 0314279 A2 | * | 5/1989 | ............ G06F/15/40 |
| JP | 2976219 B2 | | 9/1999 | |
| JP | 11-259512 A | | 9/1999 | |

* cited by examiner

*Primary Examiner*—Frantz Coby
(74) *Attorney, Agent, or Firm*—Nixon & Vanderhye, P.C.

(57) ABSTRACT

A data supply controlling device comprises a data base for user data which stores user data matched with each user. The data base of user data can be queried in accordance with the user data so that a data server performs a search according to the query and stores the search results in a search result data base. User ID management can be performed for separately managing the identifying data to identify each user and user specifying data to specify each user. A search result matched with the identifying data of the user from the search results stored in the search result data base is provided for a user terminal. Once the user data is stored, it is not required to carry out further communications to input the user data. Privacy protection of the user and improvement of communications efficiency are both fulfilled in the system to search for information in accordance with user data.

39 Claims, 16 Drawing Sheets

FIG 16

| DATA COMPARISON SERVICE | | |
|---|---|---|
| ■ CATEGORY<br>PERSONAL COMPUTING | SCORE = ZZ% (XXX/YYY)   LEVEL=N | |
| ☐ AUTHOR<br><br>☐ BIOGRAPHICAL<br>   DATA<br><br>☐ ...<br><br>☐ ...<br><br>☐ ...<br><br>ENTER | XXX BREAKDOWN<br>BOOK A2   3 POINTS<br>BOOK B11  1 POINT<br>BOOK C1   1 POINT<br>...<br>(ADDITIONAL POINTS)<br>BOOK A1   1 POINT<br>BOOK B12  1 POINT | NOT IN POSSESSION<br>BOOK A3   5 POINTS<br>BOOK E11  2 POINTS<br>BOOK E12  2 POINTS<br>BOOK F1   1 POINT |

United States Patent US 6,745,180 B2

DATA SUPPLY CONTROLLING DEVICE, METHOD, AND STORAGE MEDIUM WHICH FACILITIES INFORMATION SEARCHING BY USER

FIELD OF INVENTION

The present invention relates to a data supply controlling device, a data supplying method, a storage medium storing a data supplying program, and a data supplying system, in which a system is used which searches for information (of books, for instance) using a data supplying device and provides search results to the user (user terminal) via the data supply controlling device in such a manner to provide information suitable for user's preference and interest by referring to user data and also to achieve improvement in both user privacy protection and communications efficiency.

BACKGROUND OF THE INVENTION

Recently, a system that enables a user to search for information (of books, for instance) on a network and place a necessary order (of books) is in practical use. In this type of system, first of all, the user sets various search conditions such as title, author's name, publisher, category, published year etc., by using a user terminal (personal computer, for instance). Then after a data search device searches for information on the basis of the search conditions, the user selects books he/she wants from the candidates searched for, by using the user terminal. And referring to the reviews etc., the user places an order. Distribution of books in electronic data form is growing today, since enormous number of titles has been published.

So, systems disclosed by Japanese Laid-Open Patent Application No. 11-259512/1999 (Tokukaihei 11-259512; published on Sep. 24, 1999) and Japanese Patent Publication No. 2976219/1999 (Tokkyo 2976219; published on Nov. 10, 1999) are examples of the system to provide information via the network as above.

In the system disclosed by Japanese Laid-Open Patent Application No. 11-259512, by a data search device, information is searched for while a query is concealed, and then unnecessary search results are deleted to make a list of the results shorter.

Nowadays, on account of the widespread use of the Internet, while a lot of information has been available from the net, security on the network has become an important issue. That is to say, although search conditions (query, for instance) are uniquely set by each user and are privacy-associated matters, the search conditions have been leaked to outsiders through line tracing etc. However, the system as above can ensure the confidentiality of the search conditions, since the concealment of the query makes the user's intention of the search blurred, and also the system enables the user to designate any of the search conditions as confidential.

In the system disclosed by Japanese Examined Patent Publication No. 2976219, the user registers one's user data such as personality, interest etc. in the host computer in advance, and on the basis of the user data, commercial information is searched for from data sent to the host computer every day by various information service agencies such as news organizations and data banks. Communications efficiency can be improved by using this system, because once the user data is registered, there is no need to input the data every time the user searches for commercial information. Also, since the search is done on the basis of the user data, the system can provide commercial information suitable for each user, and contributes to the user's convenience.

However, in the system disclosed by Japanese Laid-Open Patent Application No. 11-259512, even though the privacy of the user is protected on account of the concealment of the query, communications efficiency is low, because every time the user tries to search, the data necessary for the search has to be input from the user terminal. As a result, the user is forced to pay higher communications costs. This kind of problem becomes particularly noticeable in the search of books that requires large amount of data to be input.

On the other hand, in the system disclosed by Japanese Examined Patent Publication No. 2976219, while communications efficiency is improved since it is not required to input the user data more than once, the privacy protection is not sufficient, due to the lack of measures against the leakage of the registered data.

In other words, in the conventional systems as described above, the user cannot be assured of both the privacy protection and the efficient provision of useful information, when information is provided.

SUMMARY OF THE INVENTION

The present invention has an objective to offer a data supply controlling device, a method of supplying data, a storage medium storing a data supply program, and a data supply system, which achieve both enhanced user privacy protection and improved communications efficiency in supplying information (search result) which is suitable to user.

A data supply controlling device in accordance with the present invention, in order to accomplish the foregoing objective, is characterized in that it includes:

a user data storage section for storing user data for each user who is to be supplied with information through a user terminal;

a query generating section for generating, based on at least the user data, a query for a data supplying device to search for the information;

a search result storage section for storing a result of a search conducted by the data supplying device for the information in accordance with the query;

an identifying data management section for managing identifying data by which each user can be identified, separately from user specifying data by which each user can be specified; and a data supplying section for generating a search result matched with the identifying data of the user from the search result stored in the search result storage section for supply to the user terminal.

With the arrangement, the query generating section generates a query based on at least the user data stored in the user data storage section. Examples of the user data may include the age, gender, and areas of interest of the user, and books owned by the user. The data supplying device searches for information in accordance with the query, and the search result is stored in the search result storage section. Of the search result stored in the search result storage section, the data supplying section supplies only the search result matched with the identifying data of the user to the user terminal.

Since the query is generated in this manner based on user data, and the data supplying device searches for information based on the query, a search result that is suitable to each user can be presented to the user. Further, once stored in the user data storage section, the user data of each user does not need to be input repeatedly. This improves communications efficiency between the user terminal and the data supply controlling device.

In addition, in the arrangement, the identifying data management section manages (for example, registers therein) identifying data, such as the user ID and certification number of the user, by which each user can be identified, separately from user specifying data, such as the name and address of the user, by which each user can be specified. This makes it difficult to specify individual users only by the identifying data even if the identifying data managed by the identifying data management section leaks out of the device or a third party infiltrates into the system, for example.

Consequently, with the arrangement, information suitable to each user can be presented to the user, and at the same time enhanced user privacy protection and improved communications efficiency can both be achieved.

A data supply system in accordance with the present invention, in order to accomplish the objective, is characterized in that it includes:

the data supply controlling device above; a data supplying device for conducting a search for the information in accordance with a query given by the data supply controlling device to provide a search result to the data supply controlling device; and a user terminal for receiving a search result suitable to each user from the data supply controlling device, the data supply controlling device, the data supplying device, and the user terminal being interconnected through a communications network.

In the arrangement, the data supply controlling device, the data supplying device, and the user terminal are interconnected through a communications network. Thus, a system can be offered which provides both enhanced privacy protection and improved communications efficiency.

A data supply controlling device in accordance with the present invention, in order to accomplish the objective, is characterized in that it includes:

user data storage section for storing user data for each user who is to be supplied with information through a user terminal;

a query generating section for generating, based on at least the user data, a query to search data supplied from a data supplying device;

a search section for searching for the information in accordance with the query;

a search result storage section for storing a result of a search conducted by the search section;

an identifying data management section for managing identifying data by which each user can be identified, separately from user specifying data by which each user can be specified; and a data supplying section for generating a search result matched with the identifying data of the user from the search result stored in the search result storage section for supply to the user terminal.

In the arrangement, the query generating section generates a query based on at least the user data stored in the user data storage section. Examples of the user data may include the age, gender, and areas of interest of the user, and books owned by the user. The search section searches the data supplied from the data supplying device for the information in accordance with the query, and the search result is stored in the search result storage section. Of the search result stored in the search result storage section, the data supplying section supplies only the search result matched with the identifying data of the user to the user terminal.

Since the query is generated in this manner based on user data, and the information is searched for based on the query, a search result that is suitable to each user can be supplied to the user. Further, once stored in the user data storage section, the user data of each user does not need to be input repeatedly. This improves communications efficiency between the user terminal and the data supply controlling device.

In addition, in the arrangement, the identifying data management section manages (for example, registers therein) identifying data, such as the user ID and certification number o the user, by which each user can be identified, separately from user specifying data, such as the name and address of the user, by which each user can be specified. This makes it difficult to specify individual users only by the identifying data even if the identifying data managed by the identifying data management section leaks out of the device or a third party infiltrates into the system, for example.

Consequently, with the arrangement, information suitable to each user can be presented to the user, and at the same time enhanced user privacy protection and improved communications efficiency can both be achieved.

A data supply system in accordance with the present invention, in order to accomplish the objective, is characterized in that it includes:

the data supply controlling device above;

a data supplying device for supplying, to the data supply controlling device, data to be searched by the data supply controlling device; and a user terminal for receiving a search result suitable to each user from the data supply controlling device, the data supply controlling device, the data supplying device, and the user terminal being interconnected through a communications network.

In the arrangement, the data supply controlling device, the data supplying device, and the user terminal are interconnected through a communications network. Thus, a system can be offered which provides both enhanced privacy protection and improved communications efficiency.

A method of supplying data in accordance with the present invention, in order to accomplish the objective, is characterized in that it includes the steps of:

storing, in a user data storage section, user data for each user who is to be supplied with information through a user terminal;

generating, based on at least the user data, a query for a data supplying device to search for the information;

storing, in a search result storage section, a result of a search conducted by the data supplying device for the information in accordance with the query;

registering, in an identifying data management section, identifying data by which each user can be identified, separately from user specifying data by which each user can be specified; and generating a search result matched with the identifying data of the user from the search result stored in the search result storage section for supply to the user terminal.

With the arrangement, a query is generated based on at least the user data stored in the user data storage section. Examples of the user data may include the age, gender, and areas of interest of the user, and books owned by the user.

The data supplying device searches for information in accordance with the query, and the search result is stored in the search result storage section. Of the search result stored in the search result storage section, only the search result matched with the identifying data of the user is supplied to the user terminal.

Since the query is generated in this manner based on user data, and the data supplying device searches for information based on the query, a search result that is suitable to each user can be presented to the user. Further, once stored in the user data storage section, the user data of each user does not need to be input repeatedly. This improves communications efficiency between the user terminal and the data supply controlling device implementing the foregoing process.

In addition, in the arrangement, the identifying data management section registers therein identifying data, such as the user ID and certification number of the user, by which each user can be identified, separately from user specifying data, such as the name and address of the user, by which each user can be specified. This makes it difficult to specify individual users only by the identifying data even if the identifying data registered in the identifying data management section leaks out of the device, or a third party infiltrates into the system, for example.

Consequently, with the arrangement, information suitable to each user can be presented to the user, and at the same time enhanced user privacy protection and improved communications efficiency can both be achieved.

A method of supplying data in accordance with the present invention, in order to accomplish the objective, is characterized in that it includes the steps of:

storing, in a user data storage section, user data for each user who is to be supplied with information through a user terminal;

generating, based on at least the user data, a query to search data supplied from a data supplying device;

searching for information in accordance with the query;

storing a search result in a search result storage section;

registering, in an identifying data management section, identifying data by which each user can be identified, separately from user specifying data by which each user can be specified; and generating a search result matched with the identifying data of the user from the search result stored in the search result storage section for supply to the user terminal.

With the arrangement, a query is generated based on at least the user data stored in the user data storage section. Examples of the user data may include the age, gender, and areas of interest of the user, and books owned by the user. The data supplied from the data supplying device is searched for the information in accordance with the query, and the search result is stored in the search result storage section. Of the search result stored in the search result storage section, only the search result matched with the identifying data of the user is supplied to the user terminal.

Since a query is generated in this manner based on user data, and information is searched for based on the query, a search result that is suitable to each user can be presented to the user. Further, once stored in the user data storage section, the user data of each user does not need to be input repeatedly. This improves communications efficiency between the user terminal and the data supply controlling device implementing the foregoing process.

In addition, in the arrangement, the identifying data management section registers therein identifying data, such as the user ID and certification number of the user, by which each user can be identified, separately from user specifying data, such as the name and address of the user, by which each user can be specified. This makes it difficult to specify individual users only by the identifying data even if the identifying data registered in the identifying data management section leaks out of the device, or a third party infiltrates into the system, for example.

Consequently, with the arrangement, information suitable to each user can be presented to the user, and at the same time enhanced user privacy protection and improved communications efficiency can both be achieved.

A storage medium for storing a program implementing a data supply process in accordance with the present invention, in order to accomplish the objective, is characterized in that it stores a program executed by a computer to implement a process by means of the foregoing method of supplying data.

In the arrangement, the process by means of the method of supplying data can be implemented by a computer (for example, a data supply controlling device) executing the program.

For a fuller understanding of the nature and advantages of the invention, reference should be made to the ensuing detailed description taken in conjunction with the accompanying drawings.

BRIEF DESCRIPTION OF THE DRAWINGS

FIG. 16 is an explanatory view showing a displayed example of a result of comparison provided for a user terminal.

DETAILED DESCRIPTION OF THE PREFERRED EMBODIMENTS

Embodiment 1

The following description will describe an embodiment of the present invention, referring to figures. By the way, although information of books is taken as an example of data provided for the user in this description, this invention is not confined to providing the information of books. This invention can be applied to provide general information of such as cars, watches and other commodities, for instance, by adding a database.

Figure 1:
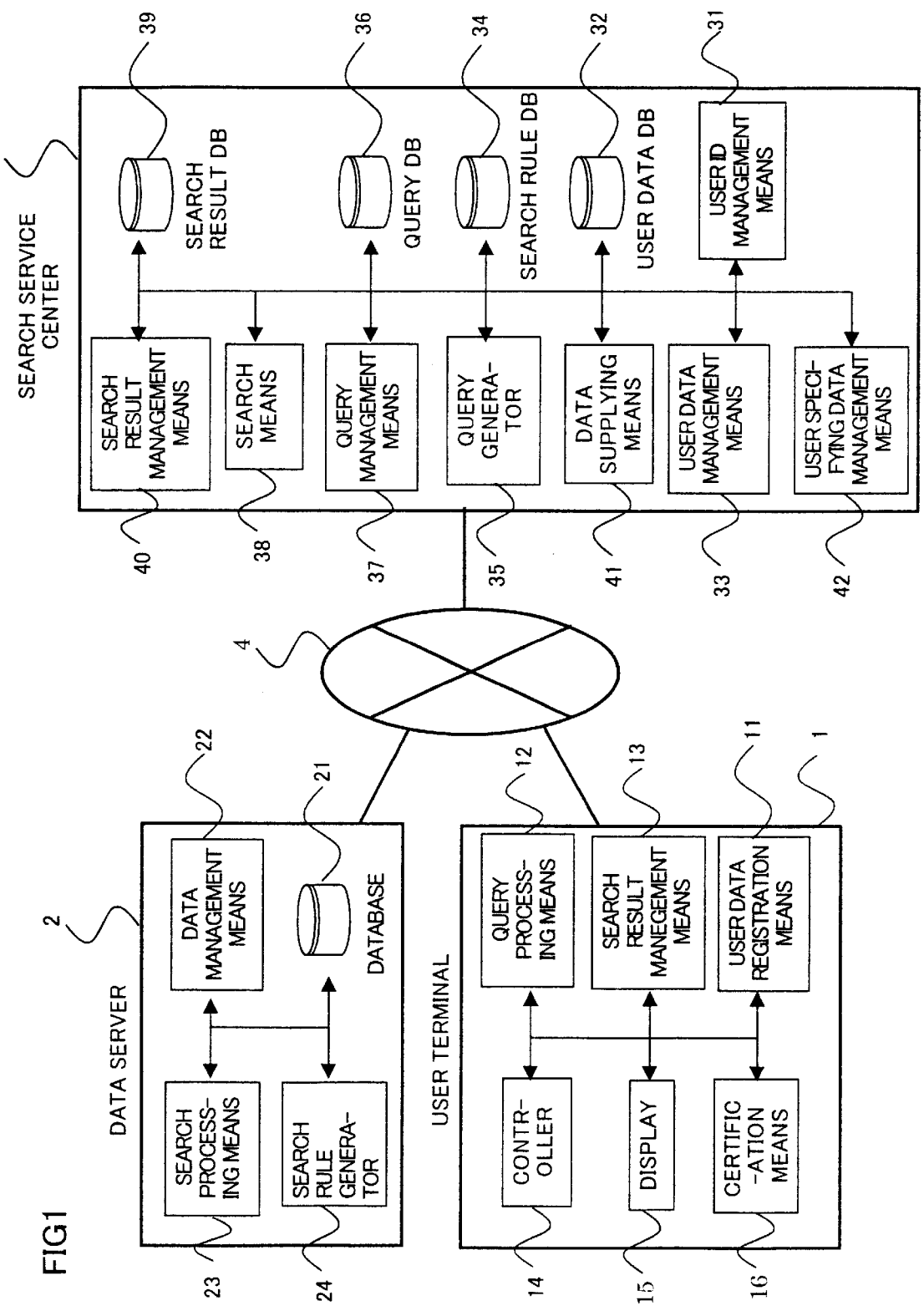
FIG. 1 is a block diagram in accordance with an embodiment of the present invention, showing a general arrangement of a data supplying system.

FIG. 1 shows a general arrangement of a data supplying system in accordance with this embodiment. This system contains a user terminal 1, a data server (data supplying device) 2, and a search service center (data supply controlling device) 3, and all of them are connected to each other through a network (communications network) 4 such as the Internet.

By the way, in this system, usually multiple user terminals 1 owned by the users and multiple data servers 2 (depending on types of information to provide) are connected through the network 4. However, to clarify the arrangement of the user terminal 1 and the data server 2, one user terminal 1 and one data server 2 are shown in the figure. Of course, a data supplying system including one user terminal 1 and one data server 2 may be arranged.

The user terminal 1 is used by the user being provided data by the present system. What can be used as the terminal 1 are, for instance, devices owned by the users and can be connected to the network 4 such as a PC (personal computer), a mobile information terminal and a mobile phone, and also a dedicated terminal capable of being used in the system.

The data server 2 is a server storing data provided for the user and also searching data appropriate to each user, according to a search request from the search server center 3. What can be used as the data servers 2 are, for instance, various websites on the network capable of providing data for the users such as on-line bookstores, websites containing information about selling books, and publisher's websites.

The search service center 3 stores the user data of each user, and also generates queries to be provided for the data server 2, by using the user data. A search result of the data server 2 is sent to the search service center 3, then from the search service center 3, the result is provided for the user terminal 1 of the user, according to the user's demand. This search service center 3 functions as a device to control a search of the data server 2, and a transmission of data, being an object of the search, from the data server 2 to the search service center 3 (this process will be described at the end of an embodiment 2).

Concrete arrangements of the user terminal 1, the data server 2 and the search service center 3 are successively described as follows.

The user terminal 1 includes user data registration means 11, query processing means 12, search result management means 13, a controller 14, a display 15, and certification means 16.

The user data registration means 11 registers each user's user data necessary to generate queries in the search service center 3, by following instructions from the controller 14. The user data registered in the user data registration means 11 is transferred to the search service center 3 afterwards. A detailed description of the user data is given later.

The query processing means 12 instructs to transfer the search results, to the user terminal 1, sent from the data server 2 to the search service center 3 by following an instruction of the controller 14. In the present system, a data search of the data server 2 is periodically done, for instance, once in a week. However, the search results are not transferred to the user terminal every time the search is done but transferred when the user demands the search result.

The search result management means 13 stores the search results being transferred from the search service center 3 to the user terminal 1.

The controller 14 is operated by the user to register the user data, to demand the transfer of search results and also to input a user ID, a certification number etc., and the controller 14 includes such as a keyboard and a mouse, for instance. The display 15 offers a GUI (Graphical User Interface) for various operations and displays search results, and includes a PC monitor, for instance.

The certification means 16 is used to access the search service center 3 and to confirm user IDs and a certification numbers input by the user by using the controller 14, when data is provided.

The data server 2 contains a database 21, data management means 22, search processing means 23 and a search rule generator 24.

The database 21 stores data provided for the user (data searched for), and in this embodiment it is information about books. Provided that multiple data servers 2 are connected to the network, each database 21 of data servers 2 stores specialized data (apart from books, about cars and watches, for instance) to which each data server 2 is dedicated.

The data management means 22 manages mainly a renewal of data being stored in the database 21. For instance, when new titles are published, the data management means 22 instructs the database 21 to store the data of the new titles.

The search processing means 23 actually searches the database 21, in accordance with the queries sent from the search service center 3.

In the process to generate queries in the search service center 3 as above, the search rule generator 24 provides multiple types of search rules to be stored in a search rule DB 34 (discussed later) of the search service center 3. What the search rule regulates is a rule by which on the basis of the registered user data, the search service center 3 generates queries in accordance with types of searched data.

If the data server 2 is a server searching information of books as in the present embodiment, as the search rule described above, the search rule generator 24 sets a rule that enables the search service center 3 to generate queries, which are capable of searching information of books, on the basis of the user data. To be more specific, examples of search rules are such as:

"If the user's possession data is international travel series, generate queries capable of searching guide books about international travel."

"If the user lives in Osaka and is interested in travel, generate queries capable of searching guide books of travel around Kansai region."

If the data server 2 is a server searching information of cars, as the search rule described above, the search rule generator 24 sets a rule that enables the search service center 3 to generate queries, which are capable of searching information of cars, on the basis of the user data. To be more specific, examples of search rules are such as:

"If the user is under 25, generate queries capable of searching cars which are popular among twentysomethings."

"If the user is interested in camping, generate queries capable of searching four wheel drive cars and wagons."

Since the search rule generator 24 sets search rules in accordance with types of data provided by the data server 2, after the search rule generator 24 transfers the search rule to the search service center 3, a query generator 35 (discussed later) of the search service center 3 can recognize which search rule is capable to generate the queries to instruct the appropriate data server 2 to search. On account of this, even if there are multiple data servers 2 corresponding to types of the provided data, in accordance with the provided search rule, the query generator 35 generates queries that instruct an appropriate data server 2 to search for data corresponding to the provided search rule, and as a result, data that the users need can certainly be searched.

Also, even if new titles are published, the search rule generator 24 can provide a search rule, generating queries capable of searching the new titles, for the search service center 3. Thus new titles can be searched by using the queries as above.

Next, the search service center 3 is described. The search service center 3 includes user ID management means 31, a user data DB 32, user data management means 33, the search rule DB 34, the query generator 35, a query DB 36, query management means 37, search means 38, search result DB 39, search result management means 40, data supplying means 41, and user specifying data management means 42.

The user ID management means (identifying data management means) 31 manages user IDs and certification numbers which are used as identifying data to identify each user of the search service of the present system.

The user data DB (user data storage means) 32 registers and stores user data, which is;
 registered from the user data registration means 11 of the user terminal 1;
 transferred to the search service center 3; and
 unique to each user for whom data is provided via the user terminal 1.

In the present system, each user's user data is registered and stored to correspond to each one's user ID in the user data DB 32, because multiple user terminals 1 owned by each user send user data. By the way, a detailed description of the user data is given later.

The user data management means (user data management means) 33 manages a registration of user data with the user data DB 32, and also manages modification and update of user data in the user data DB 32.

The search rule DB (search rule storage means) 34 stores search rules, which are sent from the search rule generator 24 of an appropriate data server 2, in each data server 2. That is to say, the search rule DB 34 stores search rules regulating the process that the query generator 35 generates queries matched with data to be searched. By the way, a data arrangement of search rules is described later.

In accordance with each user's user data and search rules stored in the search rule DB 34, the query generator (query generating means) 35 generates queries capable of searching data that the users want, through the data server 2. A search rule is renewed every time new rule is provided from the search rule generator 24 of the data server 2, so thanks to the latest search rule, the query generator 35 can always generate appropriate queries.

To be more specific, as the queries described above, the query generator 35 generates the first query to include information that the user requires in the search results and the second query concealing the first query, and then the query generator 35 provides these two for the data server 2.

The first query contains a base query, an additional query, and an exclusive query. The base query is a condition to include data matched with user data in the search results. The additional query is a condition to include data missed by the base query in the search results. The exclusive query is a condition to exclude each piece of poorly related data from the search results. The query generator 35 generates the queries which enables to search for data related to the users with certainty, and based on the queries, the data server 2 can search for data. On account of this, useful information is surely provided to the users.

Furthermore, the second query includes a dummy query to include data unnecessary for the user in the search results. Providing the dummy query in conjunction with the first query for the data server 2 causes that it becomes difficult to extract the search results matched with the first query from the search results derived from both the first query and the dummy query, since the dummy query conceals the first query. Therefore, even if search results are leaked out from the system, confidentiality of the user's search results can be surely protected, since it becomes extremely difficult to specify data that the user really wants.

Moreover, the query generator 35 generates a filtering query to delete the search results matched with the dummy query from the search results stored in the search result DB 39. On account of this, while concealing the first query by the dummy query, unnecessary search results can be deleted. So only information that the user really wants can be provided for the user in the end.

The query DB 36 stores specified queries, matched with each the user ID, generated by the query generator 35 as above. In this embodiment, among the queries, the base query, the additional query and the dummy query are stored in the query DB 36. Meanwhile, the exclusive query and the filtering query are registered in the user data DB 32.

The query management means (query management means) 37 manages;
 storing of queries in the query DE 36; and
 modification and update of queries stored in the query DB 36,
merges and manages;
 queries for each user generated by the query generator 35, and provides;
 merged query for the data server 2.

The search means 38:
 keeps track of the data server 2 capable of doing a data search by using queries generated in accordance with a specified search rule;
 provides queries specified by the query management means 37 for the data server 2; and
 gives instructions to the data server 2 to search data in accordance with the queries.

The search result DB (search result storage means) 39 exclusively manages and stores search results sent from the data server 2 that conducted searching by using the queries as above.

The search result management means (search result management means) 40 manages correlations:
 between data (search result) stored in the search result DB 39 and identifying data of the user; and between the search result as above and the queries matched with each the user ID stored in the query DB 36.

In this system, a data search is not done on a one-by-one basis by using each user's query but done integrally, by virtue of queries of each user being merged in the query management means 37 and a merger query being provided for the data server 2. Therefore, the search result DB 39 stores search results of all users.

In accordance with a requirement of search results from the user terminal 1, the data supplying means (data supplying means) 41 extracts a search result (stored in the search result DB 39) matched with an identifying data (user ID) managed by the search result management means 40, and provides the result for the user terminal 1. That is, from search results stored in the search result DB 39, the data supplying means 41 provides the search results, which are not deleted by the filtering query, for the terminal 1.

If, for instance, the data supplying means 41 provides search results, matched with each user, for the user terminal 1 only when the user demands the results by using the user terminal 1, it becomes unnecessary to send the search results to the user terminal 1 when the user does not need. So, risks that search results are leaked out due to communications etc. can be minimized, and the privacy protection is further ensured.

By the way, this embodiment basically adopts so-called pull-type system that the data supplying means 41 provides data for the user terminal 1 in accordance with demand (push) from the users. However, the present system may be arranged as push-type system that the data supplying means 41 actively provides data (at regular frequencies, for instance) even without user's demand.

The user specifying data management means (user specifying data management means) 42 manages user specifying data which can specify each user. Also, the means 42 is used when recording/reading the user specifying data to/from, for instance, a removable storage medium, and the means 42 manages the user data in a condition that online access from outside is not available. The user specifying data as above includes user's name, address, IP address etc., as examples.

The user specifying data is used when making contact with users is required in the system administration. That is to say, when users are offered the data supplying service of the present system, owing to the user specifying data, the users can receive announcements such as:

a deletion of the provided data, which has not seen for a long time, from the search result DB 39; and a billing when a chargeable service is provided.

So, although the user specifying data does not really influence the process of data providing itself, it becomes essential when it is necessary to make contact with the users.

In the present embodiment, user IDs and certification numbers managed by the user ID management means 31 and user specifying data managed by the user specifying data management means 42 are collectively called user registration data. In this manner:

user IDs and certification numbers; and user specifying data are managed independently in this system.

Figure 2:
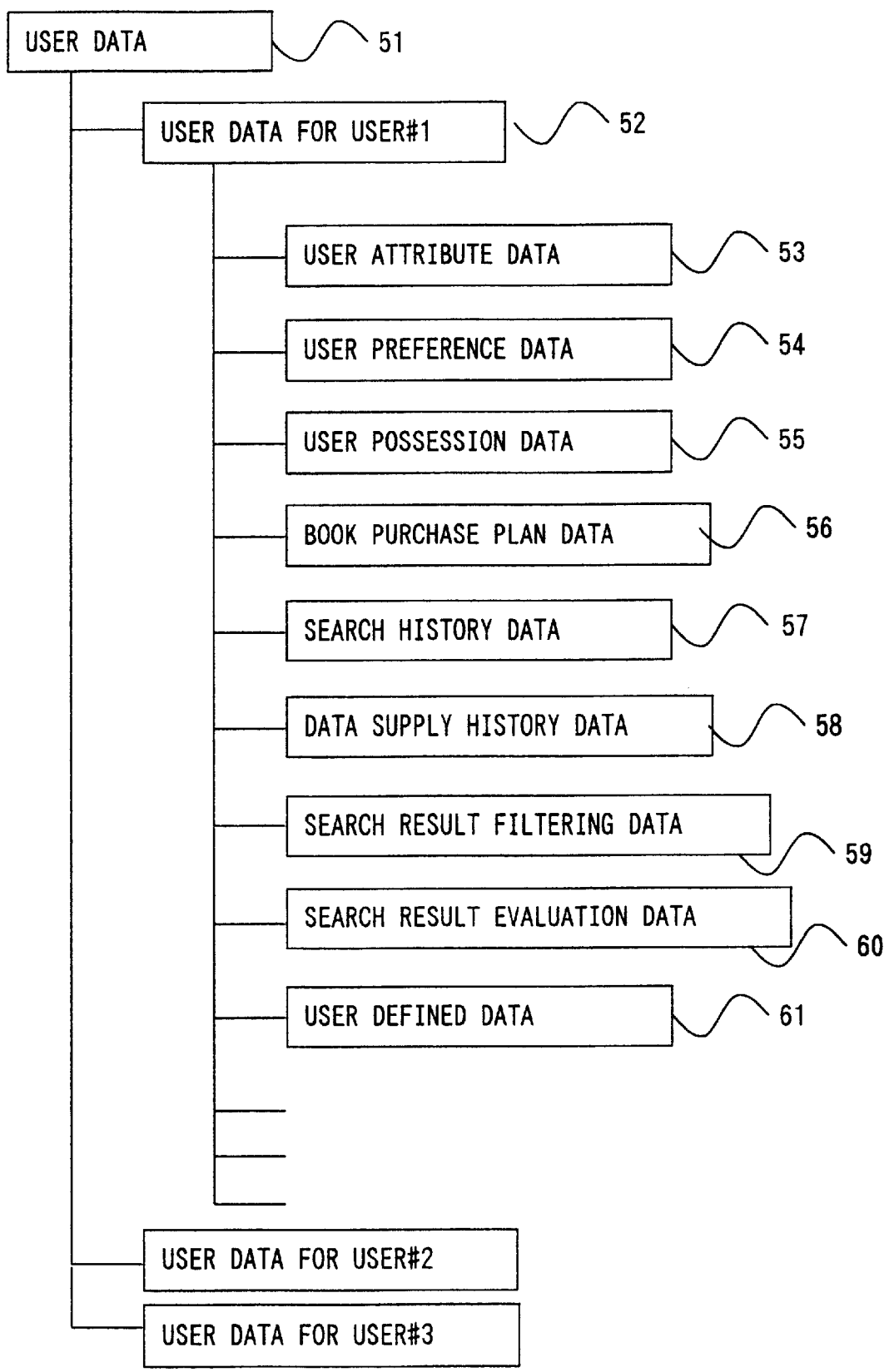
FIG. 2 is an explanatory view showing an example of an arrangement of user data registered in a user data DB of a search service center of the data supplying system.

Now, according to an input process of the user terminal 1, a detailed description of user data, stored in the user data DB 32 of the search service center 3, is given. FIG. 2 shows an example of a data structure of user data 51 stored in the user data DB 32. Incidentally, what will be described here is user data 51 to search for information of books.

The user data 51 is a specific example of user data stored in the user data DB 32, and arranged to include multiple number of sets of user ID data 52 matched with each user's user ID. In other words, the user data 51 is managed on user-by-user basis, according to each set of user ID data 52.

Each set of user ID data 52 includes user attribute data 53, user preference data 54, user possession data 55, book purchase data 56, search history data 57, data supply history data 58, search result filtering data 59, search result evaluation data 60, and user defined data 61.

The user attribute data 53 is data attributed to user's personal circumstance, such as age, gender, occupation, living area etc. The user preference data 54 is data about each user's interest and preference. The user possession data 55 is about books that the user owns. The book purchase data 56 is data of books that the user plans or wants to buy in the future.

The search history data 57 is data about a history of searching conducted on the data server 2. The data supply history data 58 is, about the data already provided for the user, and an evaluation and a comment originally attached to the data.

The search result filtering data 59 is data required when the query generator 35 generates a exclusive query and a filtering query (both described later) which are necessary to delete unnecessary data included in the search results. Provided that the search result filtering data 59 is registered as user data, in the end only useful search results can be provided for the user with no unnecessary data contained.

The search result evaluation data 60 is data showing user's evaluation for the past search results. The user defined data 61 is data that the user can designate in relation to a data search, for each of the following items such as:

an each user's search rule to generate queries: an alteration of the generated search rule; and frequency to conduct the search.

The user data management means 33 encrypts user data of each user in accordance with corresponding user ID and certification number, and manages the data in accordance with each set of user ID. So the user data management means 33 can decrypt the crypted user data only when an appropriate certification number is presented in a certification procedure. On account of this, privacy of the user data can be surely protected, since it becomes difficult to crack the user data even when the user data is leaked out.

Figure 3:
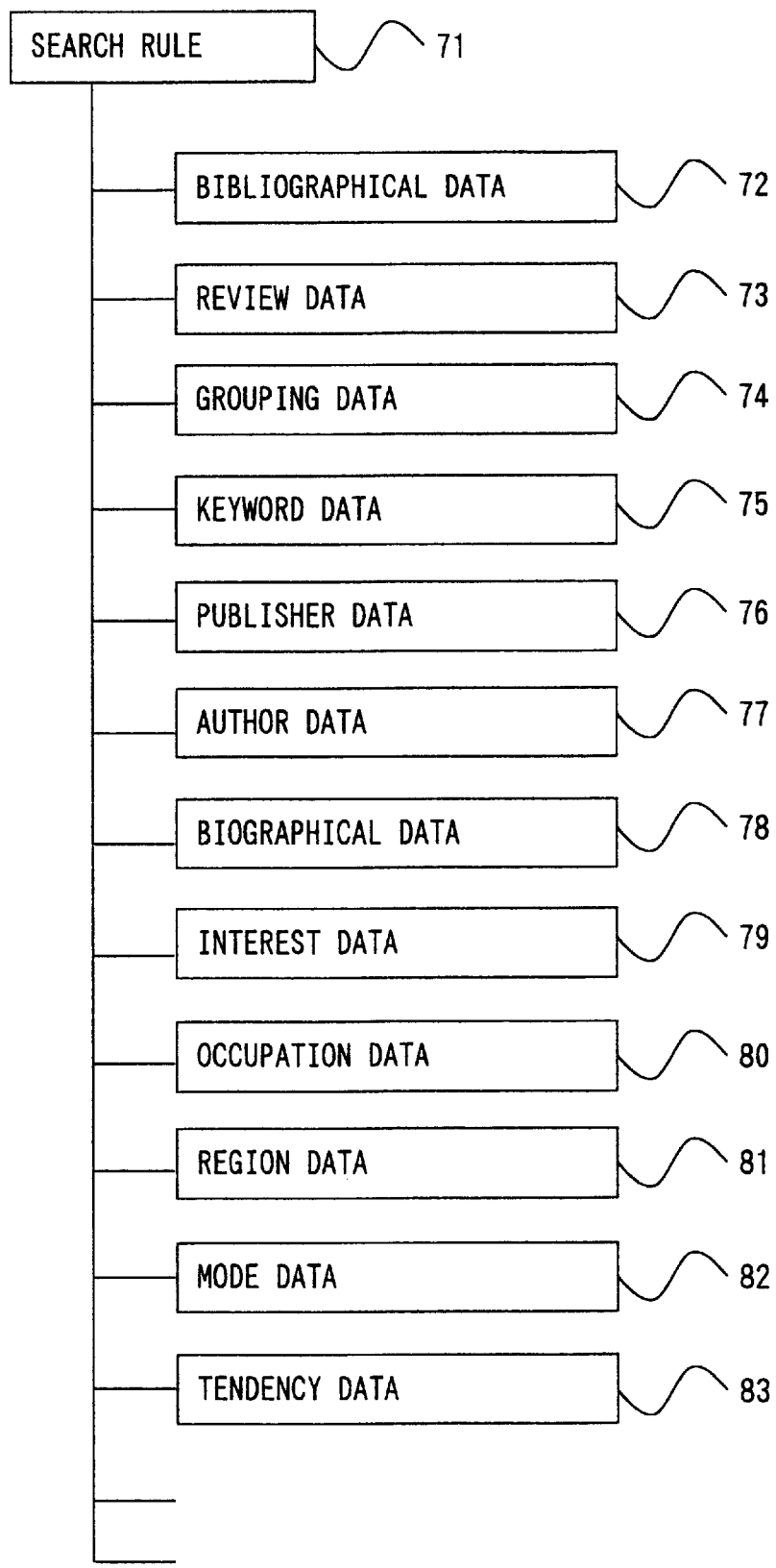
FIG. 3 is an explanatory view showing an example of an arrangement of a search rule registered in a search rule DB of the search service center 3.

Next, a data arrangement of a search rule stored in the search rule DB 34 is described. FIG. 3 shows an example of an arrangement of a search rule 71 stored in the search rule DB 34. By the way, the search rule 71 here is a search rule related to information of books.

The search rule 71 is a specific example of a search rule stored in the search rule DB 34, basically indicating a rule to get (search for) information of books, rather than the information itself.

The search rule 71 includes rules corresponding individually to bibliographical data 72, review data 73, grouping data 74, keyword data 75, publisher data 76, author data 77, biographical data 78, interest data 79, occupation data 80, region data 81, mode data 82, and tendency data 83. These kinds of data may be provided:

from the data server 2 which is a data provision source;

by a third party;

as originally created ones; and as a combination thereof above.

The bibliographical data 72 indicates a rule to get bibliographical data such as title, author, publisher, price, and published date, corresponding to a book code etc. that is used in a general book DB etc. The data 72 also indicates a rule to get data of a reference etc., when a particular book is designated to be searched.

The review data 73 indicates a rule to get data of an assessment of books such as a difficulty level, detailedness, and a critique of books, as an example. This review data 73 is used for generating queries to provide data matched with what the user designates and determining ranking of search results.

The grouping data 74 groups books regardless of classification by category, and indicates a rule to get data matched with each group. This grouping data 74 is utilized to provide data related/similar to the user possession data 55, and also information of books that are related to the data being associated with the data 55.

The keyword data 75 is a database of rules to extract major keywords from title and contents of each book. This keyword data 75 is utilized to provide data related to the contents registered as keywords in the user defined data 61 in the FIG. 2.

The publisher data 76 indicates a rule to obtain data about titles of books that are published by each publisher and major fields in which books are published. The author data 77 groups titles of books and major works by author, and sets a rule to obtain data corresponding to each group.

The biographical data 78 is a database of rules to get information of related books on a figure-by-figure basis, including not only titles of books but also contents such as historical figures and celebrities.

The interest data 79 indicates a rule to classify books in accordance with general areas of interests, and to get data matched with each area. The occupation data 80 indicates a rule to get information of books such as business books that can be provided for the user in relation to his/her occupation.

The region data 81 is a database of rules to get data related to local areas, for instance, a book that contains highly regional data and an area that is used as a scene of novel etc.

The mode data 82 is a database of rules to get bibliographical data of books related to data which is in fashion in each period, provided that arbitrary periods are designated.

The tendency data 83 indicates rules to obtain data that cannot be classified by using the data from the bibliographical data 72 to the mode data 82, for instance, such as:

information that actually many users demonstrate a propensity to set as the search condition etc., despite that the user base cannot be specified; or information that a specific user base often use, regardless of the difference of the category.

Next, an operation of the present system is described as below.

Figure 4:
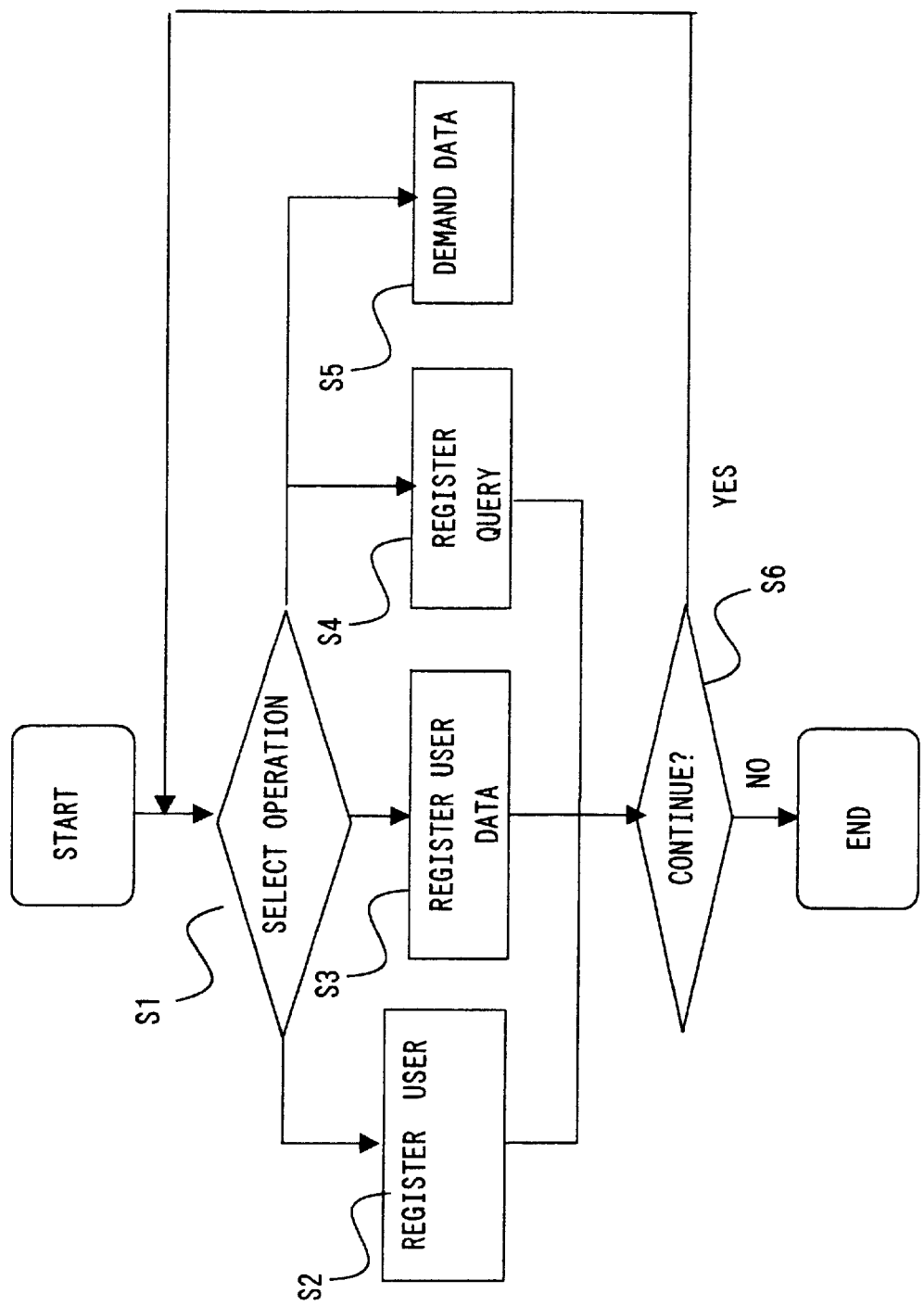
FIG. 4 is a flow chart describing an outline of a process of the data supplying system.

What is shown in FIG. 4 is the general operation of the present system. That is to say, first of all, the user selects a process to do in the present system by the user terminal 1 (step 1; "step" will be referred to as "S"). On account of this, following the selection as above, either one process of user registration (S2), user data registration (S3), query registration (S4), and data provision request (S5) is done. After the process is done, the user selects whether to move to another process or not (S6). If the user continues after S6, the operation returns to S1, and if the user does not continue, the operation is terminated.

By the way, although the operation is usually done in order as S2, S3, S4, S5, any processes can be omitted, if not necessary. That is to say, for instance, provided that it is unnecessary to modify the registered data in either process of user registration (S2), user data registration (S3) and query registration (S4), it is possible to move from selection of the process (S1) to data provision request (S5) directly. Also, when the registered user data is required to be modified, it is possible to do the data provision request (S5) process after the user data registration (S3) process is done.

A detailed description of the processes presented above, user registration (S2), user data registration (S3), query registration (S4), and data provision request (S5), is successively given in the following paragraphs.

User Registration

Figure 5:
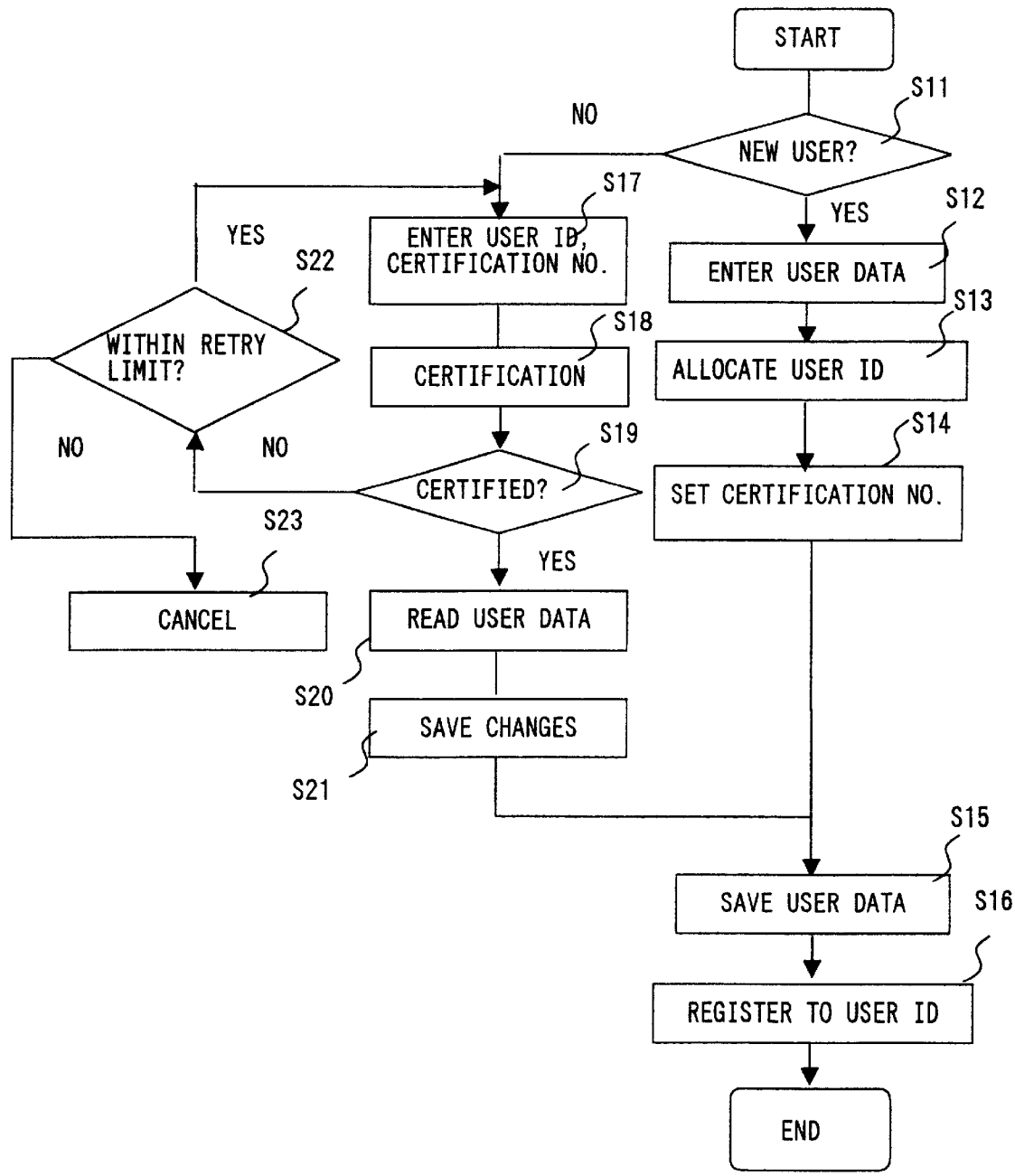
FIG. 5 is a flow chart giving a detailed description of the process of user registration shown in the flow chart of FIG. 4.

FIG. 5 is a flow chart showing the procedure of user registration shown in S2 in FIG. 4. First of all, the user selects whether it is new registration or not, by using the user terminal 1 (S11). If new registration is selected in S11, the user enters the aforementioned user specifying data for specifying each user (S12). Then a user ID is allocated to register the new user by the certification means 16 (S13), furthermore, a certification number in accordance with the user ID is set (S14). The user specifying data, the user ID and the certification number as above are sent to the search service center 3.

Then the user specifying data management means 42 of the search service center 3 saves the user specifying data of each user in the storage medium (S15). Meanwhile, the user ID management means 31 registers the user ID and the certification number matched with the user specifying data (S16).

If new registration is not selected in S11, the user enters the user ID and the certification number (S17). On account of this, a certification procedure of the user is done by the certification means 16 (S18), and the user is confirmed as an authorized user (S19).

If the certification of the user is properly done in S19, the user specifying data management means 42 of the search service center 3 reads user specifying data stored in a specified storage medium (S20). Then if this data is required to be modified, responding to an operation of modifying in the user terminal 1, the user specifying data management means 42 modifies the user specifying data (S21). Then the user specifying data management means 42 saves the modified user specifying data in the storage medium above again (S15). Also, the user ID and the certification number registered in the user ID management means 31 are registered in the user ID management means 31 again, as a user ID and a certification number matched with the modified user specifying data (S16).

If the certification of the user is not properly done in S19, the certification means 16 determines whether a number of the certification procedure being done is within retry limit or not (S22). If the certification procedure is done no more than the retry limit in S22, the certification procedure is repeated in S17. However, if the certification procedure is done more than the retry limit, the certification means 16 cancels the process as well as disconnects the system from the network 4 (S23). In this case, of course center administration means (not illustrated) of the search service center 3 checks a log of the access above and takes countermeasures against the unauthorized access.

By the way, although the description above is about the case that the user registration process is directly done online from the user terminal 1, the user registration process may be done by the user or his/her proxy by using an alternative terminal, or it is also possible that a description of the registration sent from the user offline is registered in the search service center 3.

User Data Registration Process

Figure 6:
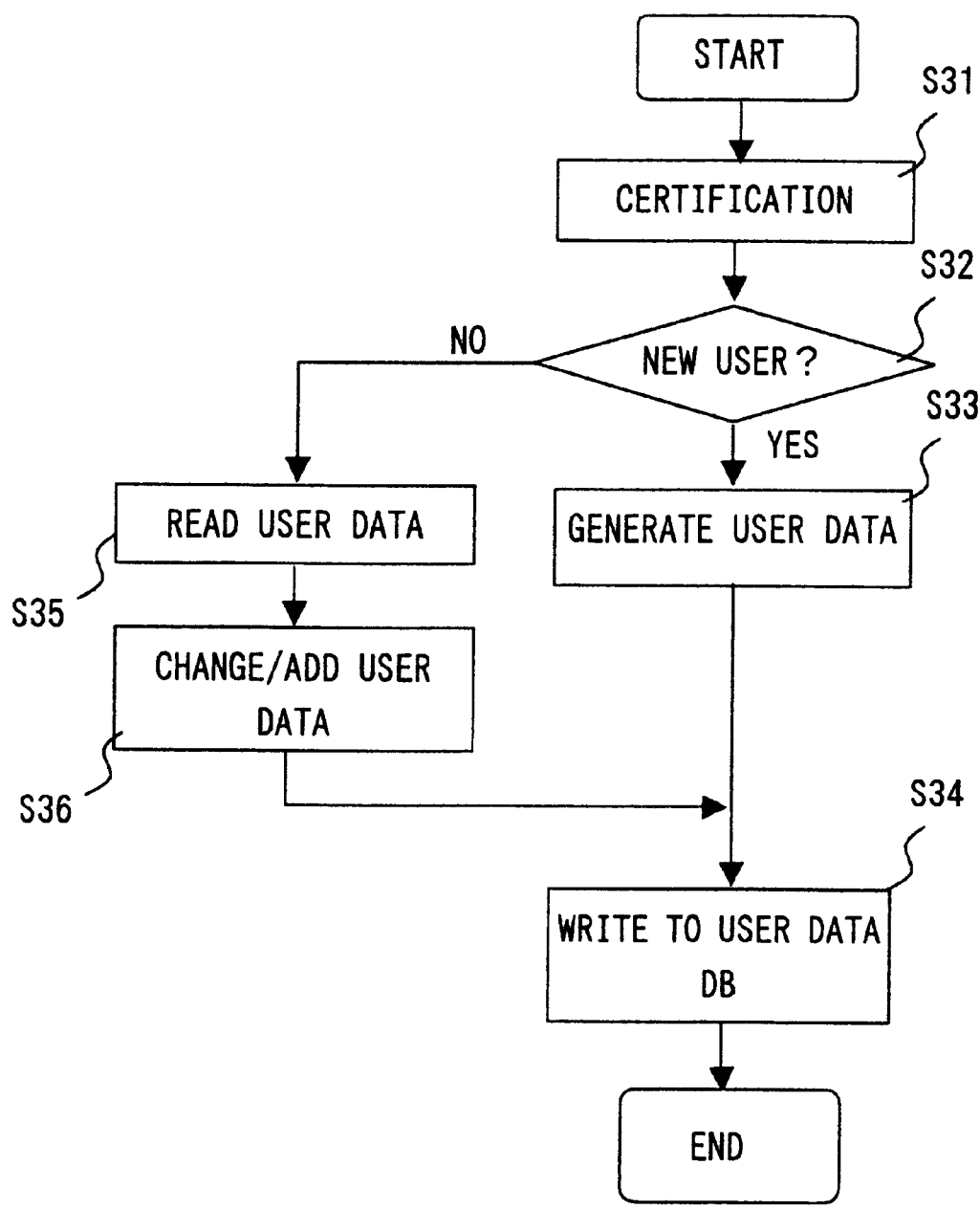
FIG. 6 is a flow chart giving a detailed description of the process of user data registration shown in the flow chart of FIG. 4.

Next, the user data registration process is described. FIG. 6 is a flow chart showing the process of user data registration (S3) in FIG. 4. By the way, the description will be given on the precondition that the user registration process shown in FIG. 5 is already done.

First of all, in the certification procedure using a user ID and a certification number of the user, the certification means 16 of the user terminal 1 confirms that the user is an authorized user (S31). Incidentally, the procedure may be omitted, if this certification procedure is done somewhere from S2 to S5 in FIG. 4 and it is followed by the process of user data registration (S3). Also, if the certification procedure is done more than the retry limit, the whole process may be canceled, as described in FIG. 5. The description about the certification procedure as above can be applied in the processes described as below: query registration and data demand.

Now, if user data is newly registered (S32), the user generates one's user data (S33). The generated user data is registered in the user data registration means 11 of the user terminal 1, and after being sent to the search service center 3, the user data is stored in the user data DB 32 by the user data management means 33 (S34)

Meanwhile, if user data is not newly registered (if user data is already registered) (S32), the user data management means 33 of the search service center 3 reads the user data which is already registered in the user data DB 32 (S35), and if any modification or addition to the user data is made through the user terminal 1, modified/added user data is newly set (S36). The newly-set user data is registered in the user data DB 32 again, by the user data management means 33 (S34).

Query Registration Process

Figure 7:
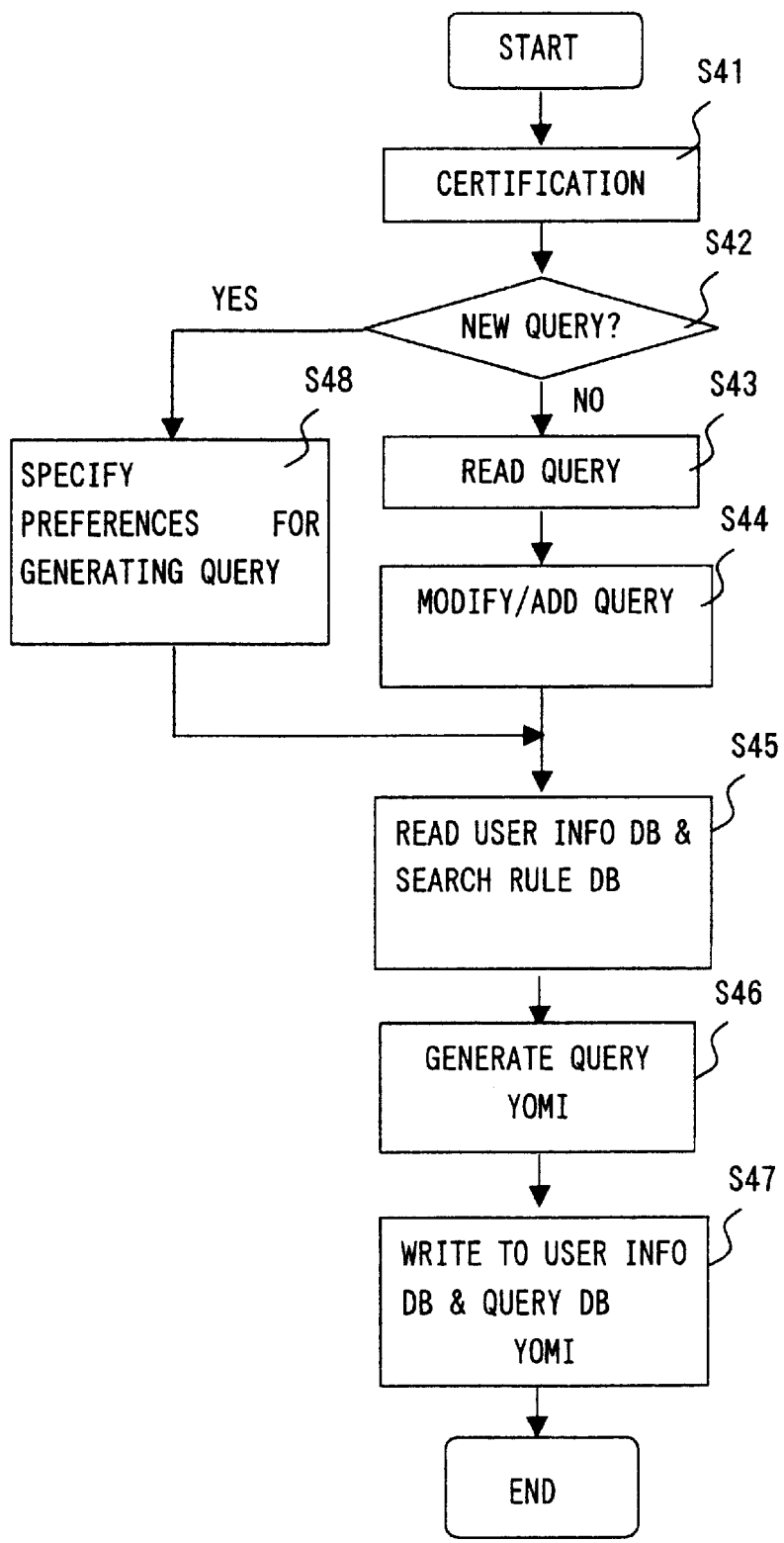
FIG. 7 is a flow chart giving a detailed description of the process of query registration shown in the flow chart of FIG. 4.

Next, the process of query registration is described. FIG. 7 is a flow chart showing the procedure of query registration (S4) in FIG. 4. By the way, the description is given on the precondition that the user data registration process shown in FIG. 6 is already done, since access to the user data DB 32 is necessary.

First of all, when the user terminal 1 confirms that the user is an authorized user by virtue of input of a user ID and a certificate number and also in the certification procedure (S41), the user selects whether generating new query or not (S42).

If the generation of new query is not selected in S42, the user terminal 1 reads already registered query matched with the user ID from the query DB 36 through the query management means 37 (S43). Then the user updates/modifies the read query as above by using the user terminal 1 (S44).

The query generator 35 of the search service center 3 reads data of modification/updating of the queries that are set by using the user terminal 1 and also data that registered in the user data DB 32, the search rule DB 34, and the query DB 36 that are needed to modify/update the queries (S45), and the query generator 35 automatically generates queries matched with the user ID (S46). By the way, a detailed description of the automatic generation of queries is given later.

Then the query management means 37 registers the queries generated in S46 in the query DB 36 again. Meanwhile, the user data management means 33 registers data, for providing data matched with a user ID (data to generate the exclusive query and the filtering query that are both described later), in the user data DB 32, as search result filtering data 59 (S47).

If the user selects to generate new query in S42, the user sets basic conditions to generate a query automatically, such as an update schedule of provided data (how often a data search is conducted), a maximum number of items of data to be provided, a search rule etc., by the user terminal 1 (S48). While the aforementioned data of the update schedule and the maximum number of items of data to be provided is stored in the user data DB 32 as the user defined data 61, for instance, the search rule above is stored in the search rule DB 34.

Then the query generator 35 reads data, registered in the user data DB 32 and the search rule DB 34, and also required to generate the query (S45). After this process, the following processes are the same ones as S46 and S47 as above.

Next, a detailed description of the aforementioned automatic generation of a query is given. By the way, what is described below is an automatic generation of a query which is already generated but is a subject to be modified/updated. As for an automatic generation of a newly-generated query, the procedure is same as the modification/update of queries except no query is read from the query DB in S45.

Figure 8:
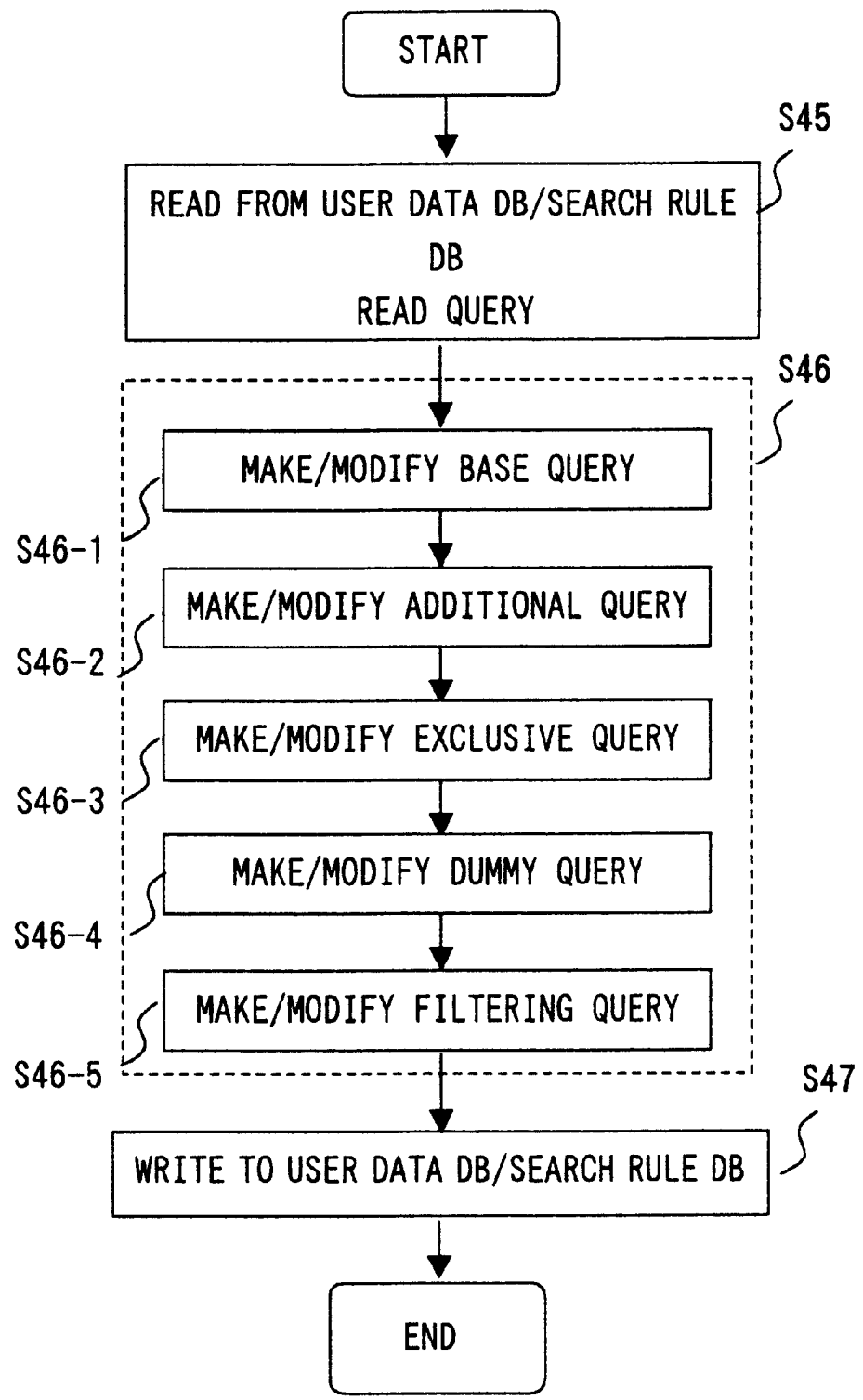
FIG. 8 is a flow chart giving a detailed description of the process to generate queries shown in the flow chart of FIG. 7.

FIG. 8 gives a detailed description of the processes shown in FIG. 7: namely, reading data from DBs in S45;

generation of the queries in S46; and registration of data in DBs in S47.

Now, to make the description easier to be understood, the user data DB 32 at least stores data below as user data, in a provisional manner.

Gender: female

Age: 25

Occupation: fashion industry

Living Area: Osaka

Interest: travel

Owns: international travel series

Books Planning to Buy: novels by novels by novelist A

User Defined Data: except male fashion magazine

After data required to generate queries is read from the user data DB 32, the search rule DB 34, and the query DB 36 in S45 in FIG. 8, first of all, the query generator 35 generates a base query that effectively covers data provided for the user (S46-1).

In this process, the query generator 35 selects a search rule, capable of searching for data which is highly probable to be related to the user possessing the user data above, from the search rules that are read above. For this reason, the selected search rule should be able to search for an information magazine of Kansai region, a fashion magazine, travel guidebook etc., inferring from gender, age, occupation, living area and interest in the user data above. Then according to the selected search rule, the query generator 35 generates a query capable of searching for an information magazine of Kansai region, a fashion magazine, travel guidebook etc., as the base query. The base query above may be such as:

(Kansai+fashion+travel)×(information magazine)

Next, the query generator 35 generates an additional query to include data, which is highly probable to be excluded by the base query, in the queries (S46-2). For instance, as for the book planned to be bought "novels by novelist A", a search in accordance with the user data can be done without omissions, due to generation of an additional query capable of searching for the novels, by the query generator 35.

Then, the query generator 35 generates an exclusive query that excludes data which is poorly related to the base query and the additional query (S46-3).

If no supplementary information is provided, all information about fashion-related books is provided regardless of gender specificity, since the registered occupation is "fashion industry". So owing to the registration of the user defined data as "except male fashion magazine", the query generator 35 generates a query to exclude male fashion magazines from the search, as the exclusive query. The exclusive query above can be construct from keywords such as (female), for instance.

Also, as the exclusive query, the query generator 35 may generate a query to exclude books similar to "international travel series" that is registered as owns.

By the way, apart form the automatic generation by the query generator 35 alone, the exclusive query may be generated by a manual operation by the user.

Next, the query generator 35 selects any query that is already registered in the query DB 36, and as a dummy query, the generator 35 adds the selected query to the queries above that are matched with the user ID (S46-4). So, data matched with the user ID in the user data DB 32 cannot be specified or inferred from the query, even if the query, matched with the user data registered in the query DB 36 and managed by the query management means 37 is leaked to outsiders.

To be more specific, according to the search rule DB 34 and data in the query DB 36, a query capable of searching information, that is not related to an occupation, gender of the user and books owned by the user such as books on electricity, books on golf, novels by novelist B, is selected from queries registered in the query DB 36 by the query generator 35, as the dummy query.

Finally, the query generator 35 generates a filtering query conducting a filtering process to exclude data, included by virtue of the dummy query generated in S46-4, from the search result (S46-5). That is to say, in the example above, as the filtering query, the query generator 35 generates a query which is able to exclude information such as books on electricity, books on golf, novels by novelist B from the search result.

Among these queries generated above:

the exclusive query and the filtering query are registered in the user data DB 32 which is accessed after the certification by the user with reference to user ID; and the base query, the additional query and the dummy query are tentatively registered in the query DB 36, after matching with the user ID and search conditions by the query management means 37.

The exclusive query and the filtering query are both queries to delete data which is unnecessary when a search result is provided for the user, while the base query, the additional query and the dummy query are essential for a data search. Therefore, it is more manageable to divide queries into the combination of the exclusive query and the filtering query and the combination of the base query, the additional query and the dummy query such as the present embodiment, because of the difference of the functions.

Also, the latter group of queries being "tentatively" registered means that the queries are stored without merge at this moment. This system aims to increase communications efficiency on account of the merge of queries matched with each of the user terminals 1 and the delivery of a single query to the data server 2. So it is inefficient to integrate the queries and store in the query DB 36, every time the user modifies the registered data etc. Thus there is a step of the tentative registration in the present system so that queries are integrated just before being sent to the data server 2, and in the end the integrated query is registered in the query DB 36.

Now, more detailed description of the method of the generation of basic queries above is given. Assuming that the present system periodically (once in a week, for instance) conducts a data search in the data server 2 and the search result of the last time or the past search results is/are stored in the search result DB 39 as search results 1 to n (n is an integer that is not less than 2).

First, the query generator 35 reads data matched with a search rule registered in the search rule DB 34 from the user data DB 32, and generates queries 1 to m (m is an integer that is not less than 2) that are candidates for the base query. After generating the queries 1 to m, the query generator 35 searches each of the search results 1 to n which are the past results stored in the search results DB 39, by the queries 1 to m. Then the user terminal 1 gets feedback from the query generator 35 about the results of it.

Based on all of the results acquired above, the user briefly evaluates the effectiveness of each of the queries 1 to m. On account of this, each of the query 1 to m gets x (m, n), which is an evaluation value of each of the queries with respect to the search results 1 to n.

Incidentally, since it is too complicated for the user to evaluate the effectiveness of the queries on all of the search results 1 to n as done above, for instance, it is possible to extract some of the search results 1 to n at random and only evaluate the queries 1 to m with respect to the extracted search results. So to lighten the workload for the user, here search results 1 to l are extracted from the whole results 1 to n, and the queries 1 to m are evaluated with respect to them.

According to the evaluation value x (m, l) acquired from the evaluation of the queries 1 to m, the query generator 35 calculates evaluations E (1) to E (m) on each of the queries 1 to m. For instance, an evaluation E (m) is given by eq. 1, $$E(m) = \frac{\sum_{k=1}^{l} x(m, k)}{l} \quad \text{(Eq. 1)}$$

where the evaluation E (m) equals the sum of the evaluation value x (m, l) obtained by the evaluation of the query m on the search results 1 to l divided by the number of the search results 1 to l (l in this equation).

So, when the query generator 35 searches for data by adopting the queries 1 to m, to keep an adequacy of the number of sets of data provided for the user each time the data is updated, as the base query, the query generator 35 adopts a query matched with several of top-ranked evaluations among the evaluations E (1) to E (m).

In this manner, as the data provision is repeated, an effectiveness of the data provision by the base query is enhanced, on account of evaluations of actually provided data and periodical renewal of the base query, both conducted even after the data provision is started.

Figure 9:
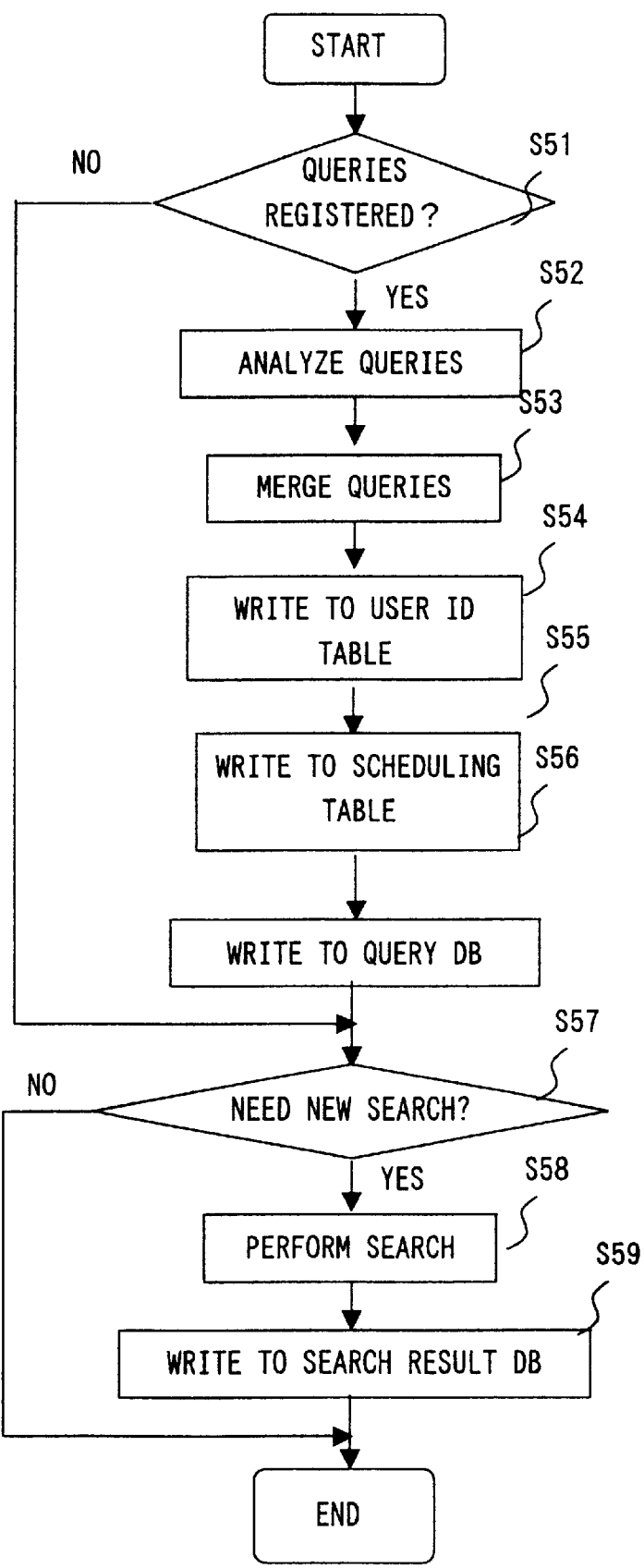
FIG. 9 is a flow chart showing a process of operation in query registration, after the generation of queries as above.

Next, based on a flow chart in FIG. 9, what is described below is a process in the search service center 3 after the generation of queries as above. Assume that the process as below is supposed to be done periodically in the search service center 3. This may be done simultaneously with the tentative registration of the queries, or done irregurally in accordance with a search schedule (not illustrated) stored in the query management means 37.

First of all, the query management means 37 judges whether the queries (base query, additional query and dummy query) are tentatively registered in the query DB 36 in S47 shown in FIGS. 7 and 8 or not (S51). If the queries are tentatively registered in S51, the query management means 37 analyzes the tentatively registered queries (S52). In other words, the query management means 37 extracts the queries (base query, additional query and dummy query) matched with a user ID from the query DB 36. Then after extracting the exclusive query matched with the user ID from the user data DB 32, the query management means 37 merges these four extracted queries (S53). By the way, merged query unifies queries when the queries share a keyword, or delete a query when it is included in another query. Transition of queries on account of the merge will be described later.

By the way, the merged query inevitably includes a query that is irrelevant to a user ID, when the queries are merged. The aforementioned dummy query corresponding to this irrelevant query. Thus, the merge of four queries as above essentially equivalent to merging three queries (base query, additional query and exclusive query).

Then the query management means 37 stores the filtering query matched with each user ID, which is stored in the user data DB 32, in a user ID table (not illustrated) included in the query management means 37 (S54). The filtering query above is a query to acquire search results matched with a user ID from the search results made by the merged query which is merged in S53. That is to say, the filtering query can exclude search results matched with the dummy query from the search result of the merged query.

So, the query management means 37 generates schedule data to conduct a data search by the queries registered in the query DB 36, from:
  data about desirable time or duration of an update schedule (conduct of the search) designated by the user in the user defined data 61; and
  data of an update schedule of the data server 2, acquired from the search rules etc. provided by the data server 2, then,
the schedule data is stored in a scheduling table (not illustrated) included in the query management means 37 (S55).

The query management means 37 registers queries which are not merged in S53 in the query DB 36, and also modifies/deletes queries registered in the query DB 36, when the query management means 37 determines that the queries are not used by a user possessing another user ID, by using a query management table (not illustrated) in the query management means 37 (S56).

Then the query management means 37 refers to the scheduling table in the query management means 37 (S57). So if a search is required, the search means 38 sends the merged query to the data server 2 and instructs the data server 2 the search. Consequently, following the instruction above, the search processing means 23 in the search server 2 searches the database 21 (S58). The data acquired from the search of the data server 2 is sent from the data server 2 to the search service center 3, and registered in the search result DB 39 altogether (S59). Meanwhile, if the instruction to search is not required according to the search schedule, the process is terminated.

The search results registered in the search result DB 39 are not unique to individual users. So in accordance with a requirement of provision of search results from the user terminal 1 (described later), the data supplying means 41 extracts the search results matched with the user ID and managed by the search result management means 40, from the search results stored in the search result DB 39, and the extracted results are provided for the user terminal 1. In this case, the data supplying means 41 can acquire the search results matched with a user ID of each user on condition that the means 41 applies the filtering query matched with the user ID to the search results stored in the search result DB 39.

The present system does not provide a search result matched with each user until the user requires to provide the search result. So the search results in the data server 2 are stored in the search result DB 39 in a cohesive manner, and the registered search results are updated concurrently with the conduct of the search.

Meanwhile, if the queries are not tentatively registered in the query DB 36 in S51, i.e. the merged query are already registered in the query DB 36, the operation is started from S57, and proceeded accordingly as above.

The following is a concrete description of the processes S54 and S56 as above. So, to make the description easier to be understood, it is assumed that the merged query contains, for instance, a query 1 including (female)×(fashion industry) and a query 2 including a sole keyword (X series by novelist A), and queries are updated weekly.

As for the query 1, if a query related to the fashion industry is already included in the query DB 36, the query management means 37 records the query number of the query above and the instruction to omit male fashion magazines in the user ID table. If there is no query related to the fashion industry in the query DB 36, the query management means 37 stores the query 1 in the query DB 36 with no alteration, and also records the query number of the query 1 in the user ID table.

Like the query 1, as for the query 2, if a query about all novels by novelist A is already included in the query DB 36, the query management means 37 records the query number of the query above and the instruction to restrict the search within X series in the user ID table. If no query related to novelist A is included in the query DB 36, the query management means 37 stores the query 2 in the query DB 36 with no alteration, and also records the query number of the query 2 on the user ID table.

Furthermore, if the query DB 36 already contains any registered queries, the queries are merged with reference to a query possessing the highest update frequency, and queries registered in the query DB 36 are updated in S56.

In other words, if one user designates to conduct a search once a day and another user designates to do it once a month through designation of search frequency in the user defined data 61, a merge of queries is conducted every day, in accordance with the search conducted once in a day.

By the way, if the data server 2 conducts a data search according to an instruction of the search in S58, the search result is registered in the search result DB 39 in accordance with the query number.

Figure 10:
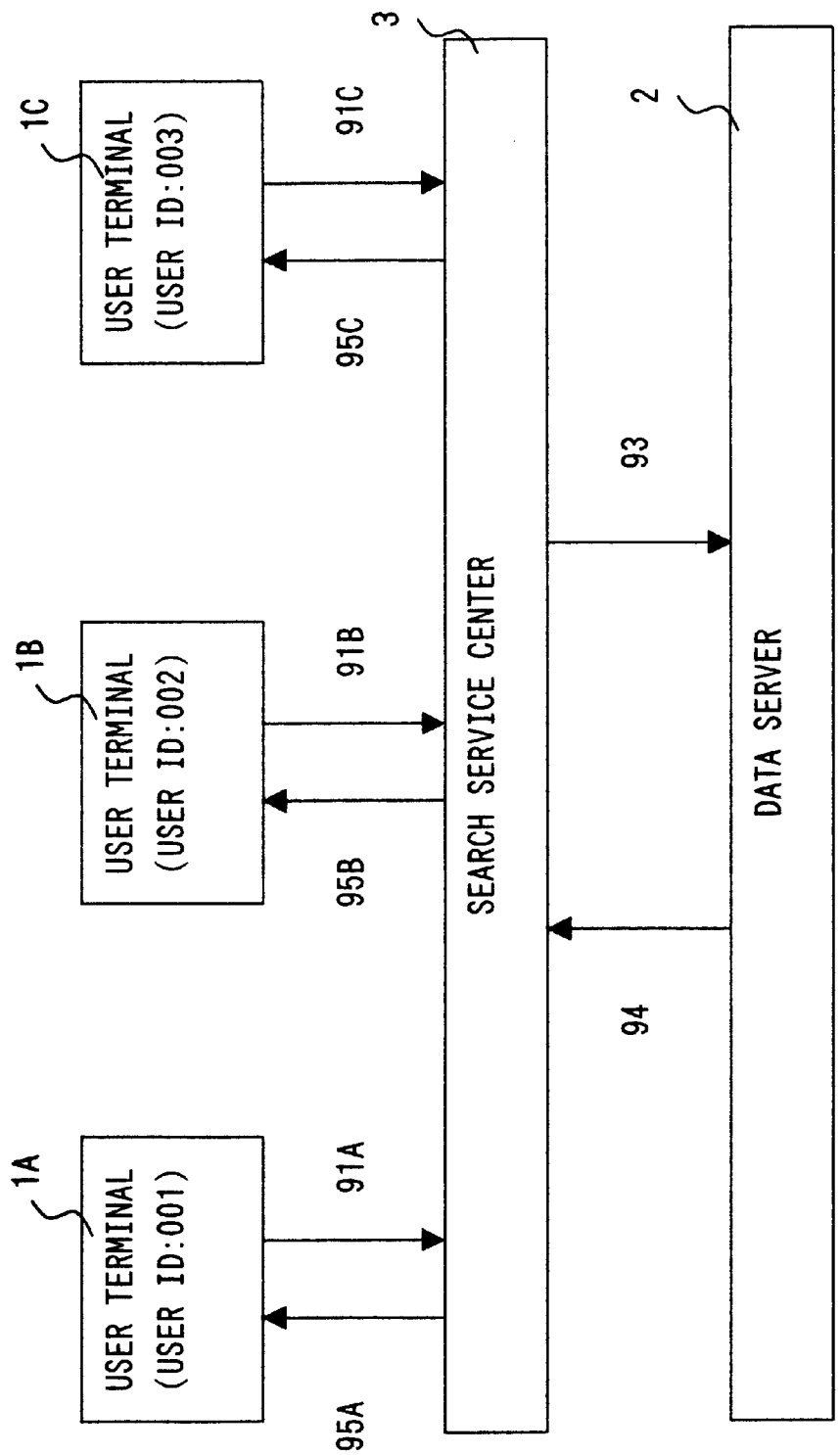
FIG. 10 is an explanatory view showing how data is exchanged between user terminals, a search service center, and a data server of the data supplying system.
Figure 11:
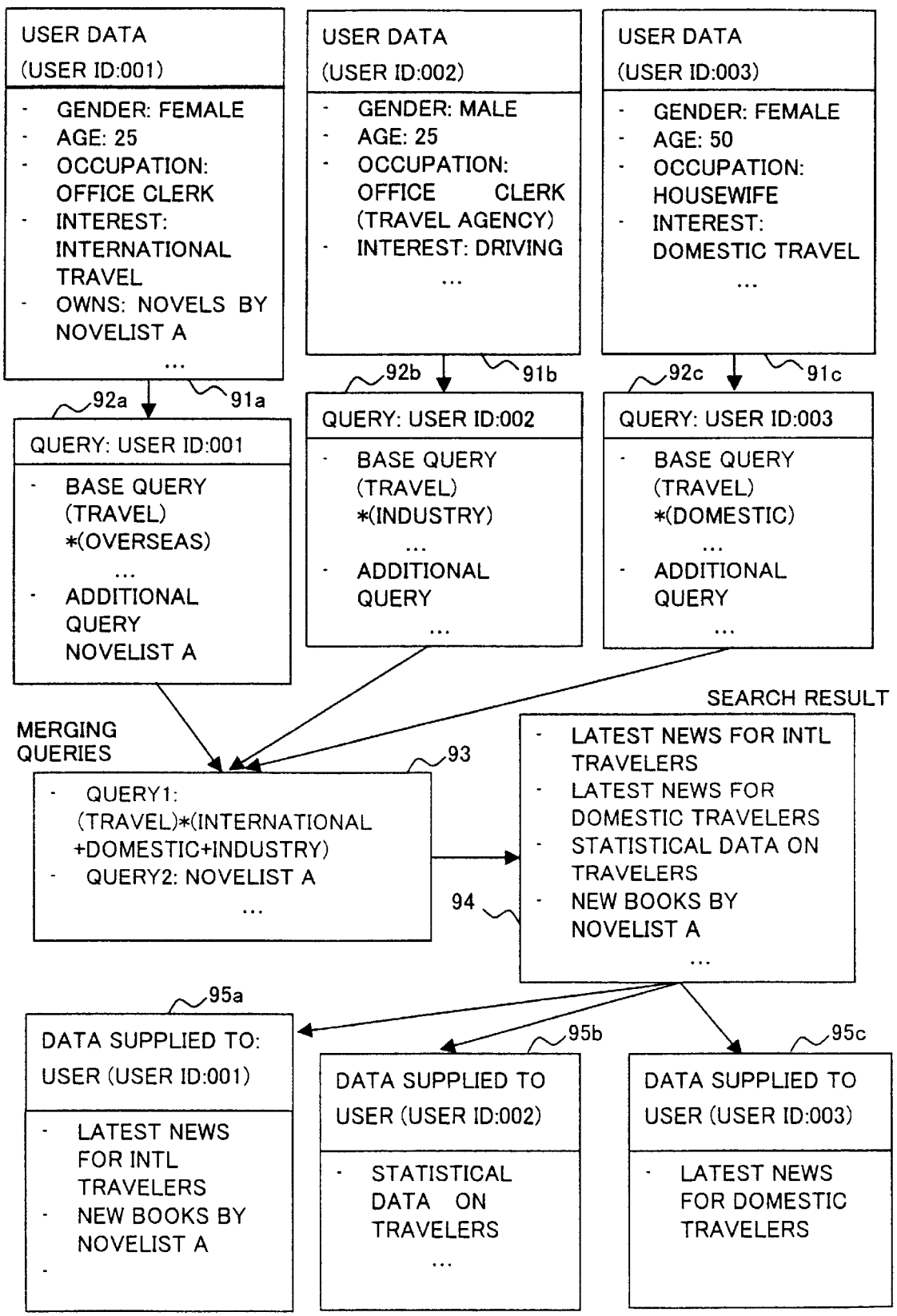
FIG. 11 is an explanatory view showing an example of the exchanged data.

Now, transition of queries and search results in the present system is described, by using FIGS. 10 and 11. Assuming that as the user terminals, there are a user terminal 1a in which a user ID corresponds to 001, a user terminal 1b in which a user ID corresponds to 002, and a user terminal 1c in which a user ID corresponds to 003.

First of all, after user data 91a, 91b and 91c matched with each user ID are input from each of the user terminals 1a, 1b and 1c, the user data 91a, 91b and 91c are registered in the user data DB 32 of the search service center 3, in accordance with each user ID. A description of the user data 91a, 91b and 91c is shown in FIG. 11.

In the search service center 3, the query generator 35 generates queries 92a, 92b and 92c for each of the users, in accordance with the user data 91a, 91b and 91c. Among the queries generated, a base query, an additional query and a dummy query are tentatively registered in the query DB 36.

The query 92a contains the base query including (travel)×(overseas) and the additional query including (novelist A) only, that are generated in accordance with the user data 91a and a search rule in the search rule DB 34. The query 92b contains a base query including (travel)×(industry), that is generated in accordance with the user data 91b and a search rule in the search rule DB 34. The query 92c contains a base query including (travel)×(domestic), generated in accordance with the user data 91c and a search rule of the search rule DB 34.

Then the query management means 37 merges these queries. In this example, the three base queries above can be unified to be a query 1 including (travel)×(international+ industry+domestic), because the queries 92a, 92b and 92c share the keyword, (travel). As for the additional query in the query 92a, the query is left as a query 2, since it cannot be merged because of no commonality between the queries 92a, 92b and 92c. A merged query 93 including the queries 1 and 2 is registered in the query DB 36.

After the search means 38 sends the merged query 93 to the data server 2 at a certain timing and instructs a data search, the data server 2 conducts the data search in accordance with the merged query 93. So a merged search result 94 is acquired, and the result 94 is sent to the search service center 3 and stored in the search result DB 39.

When data provision is required from the user terminals 1a, 1b and 1c (described as below), the data supplying means 41 of the search service center 3 extracts a filtering query matched with each user ID from the user data DB 32, and based on this query, search results matched with each user ID are acquired from the merged search result 94 stored in the search result DB 39.

In this case, since the keywords included in the query 1 of the merged query 93 such as "domestic" and "industry" are not included in a base query and an additional query matched with the user ID 001, queries such as (travel)× (domestic) and (travel)×(industry) are considered as dummy queries, with reference to the query 92a. Similarly, since the keywords included in the query 1 such as "overseas" and "domestic" are not included in a base query and an additional query matched with the user ID 002, queries such as (travel)×(overseas) and (travel)×(domestic) are considered as dummy queries, with reference to the query 92b. Furthermore, since the keywords included in the query 1 such as "overseas" and "industry" are not included in a base query and an additional query matched with the user ID 003, queries such as (travel)×(overseas) and (travel)×(industry) are considered as dummy queries, with reference to the query 92c.

In this manner, provided that a filtering query to exclude search results matched with each of the dummy queries is generated for each user ID and the filtering query matched with each user ID is applied to the merged search result 94, data 95a, 95b and 95c matched with the respective user IDs are able to be acquired for supply to the users. The data 95a, 95b and 95c are provided for the user terminals 1a, 1b and 1c corresponding to the respective user IDs.

Data Provision Requirement

Figure 12:
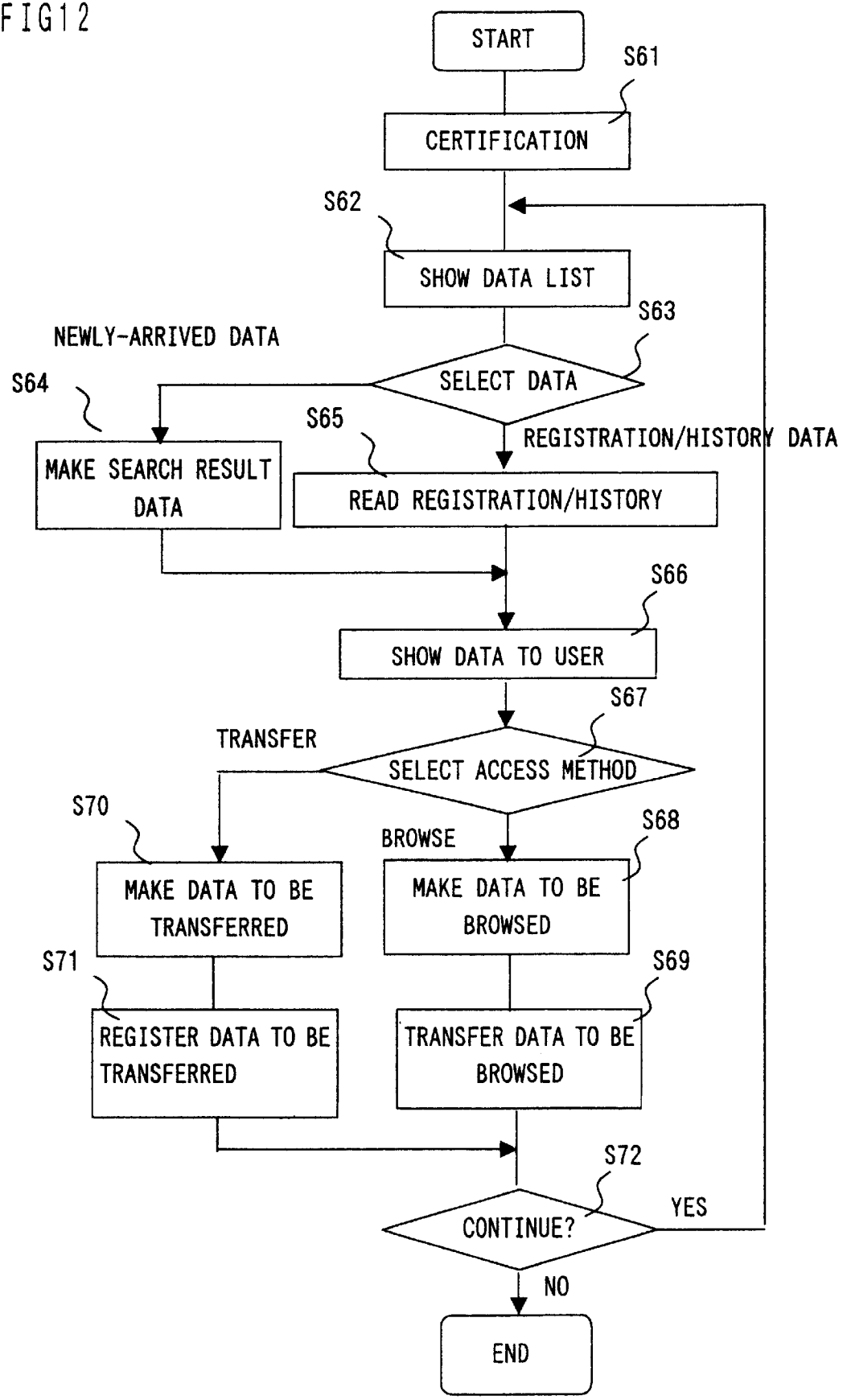
FIG. 12 is a flow chart giving a detailed description of the data demand process shown in the flow chart of FIG. 4.

Next, what is described by using FIG. 12 is processes in which the user requires the data server 2 to provide data (search results) and the data is provided for the user.

First, the user terminal 1 is connected to the search service center 3, and a certification procedure is conducted using a user ID and a certification number (S61). On account of this, the user is confirmed as an authorized user.

Then the search service center 3 presents a list of data provided for the user terminal 1 (S62). The provided data is newly arrived data, registration/history data, for instance. The newly arrived data is the latest search results in the data server 2. The registration/history data is about user data or queries registered in the user data DB 32 or the query DB 36, or about a search history.

The user selects type of data desired to be provided by using the user terminal 1 (S63). If the user selects to be provided with the newly arrived data through the registered queries in S63, the data supplying means 41 extracts data, matched with the user ID and managed by the search result management means 40, from data (search results) registered in the search result DB 39 (S64) Meanwhile, if the user selects to be provided with the registration/history data in S63, the data supplying means 41 reads necessary data to be provided for the user from databases corresponding to sets of data (S65). After the data compiled or read in S64 or S65 is sent to the user terminal 1 by the data supplying means 41, the data is displayed in detail on the display 15 of the user terminal 1 (S66).

Then the user selects a method to provide the data selected in S63 (S67). As the method, in this case, a data browse and a data transfer are available. The data browse is a method to send data to the user terminal 1 promptly, so that the user can see the data immediately by using a browser of the user terminal 1. The data transfer is a method to send the data as a file in which the data is saved altogether.

If the user selects to see data in the user terminal 1 in the manner of the data browse in S67, the data to be browsed is compiled (S68) and immediately transferred to the user terminal 1 (S69). On this occasion, in accordance with each user ID's filtering condition and data provision condition registered in the user data DB 32, the data supplying means 41 of the search service center 3 narrows down and prioritizes the data to be provided, and as the data to be browsed, the results are provided for the user terminal 1.

In the case that search results or registered data are required to be browsed immediately, or in the case that user data or queries are required to be modified/deleted immediately in accordance with the results of browsing of search results and registered data, provision of data by way of the data browse as above may be preferable.

Meanwhile, if the user selects the data transfer in S67, the data to be transferred is compiled (S70) and transferred to a certain user terminal 1 (S71). On this occasion, like the generation of the data to be browsed, in accordance with each user ID's filtering condition and data provision condition registered in the user data DB 32, the data supplying means 41 of the search service center 3 narrows down and prioritizes the data to be provided, then encrypts the generated data and temporarily stores it, and finally transfers the data to be transferred to a specified terminal at a specified time. In the case that the provided data is used in another terminal or is printed out, provision of the data by way of the data transfer may be preferable.

Subsequently, if the user selects to continue the operation, the processes as above are repeated from S62 (S72). If not selected, the operation is terminated.

By the way, as for communications means used in the data browse and the data transfer, using encryption of protocols such as SSL, the Secure Socket Layer, due consideration not to be intercepted by others is given of course.

As the description above shows, in the present embodiment, search results suitable for each user can be provided for each user, since queries are generated in accordance with user data of the user, and based on these queries, the data server 2 searches for data.

It is preferable that information of books that the user owns is included in the system to provide data by using a data search, especially when providing data related to books. However, information of books that the user owns can be regarded as highly private, thus it is desirable that the user manages the data by him/herself and utilizes for the data search. On the other hand, however, setting such data and exchanging it over the network each time the user searches data in multiple data providers cause considerable communications insufficiency and also force the user to pay a lot of communications costs, because of an immense amount of the data and a requirement to set many elements properly to search for a desired book.

So, in the present embodiment, communications between the user terminal 1 and the search service center 3 can become efficient and communications costs of the user can be reduced, since once user data of each user is stored in the user data DB 32, it becomes unnecessary to input the same user data again.

Also, the present invention is characterized in that (a) identifying data such as a user ID and a certification number and (b) user specifying data are managed separately. A probability of occurrence of leakage of the user specifying data to the outside is extremely low, because the user specifying data is stored in a storage medium being independent from the user ID and the certification number, and also is managed in a state that outsiders cannot access by the network 4. Also, even if the identifying data registered in the user ID management means 31 is leaked out, it is virtually impossible to specify the user without the above user specifying data. Hence this system managing the user ID, the certification number, and the user specifying data separately can certainly protect each user's privacy, and the user can use the data provision service with a feeling of security.

In short, the present invention can provide data suitable for each user with both improved communications efficiency and privacy protection of the user.

Also, the present invention is characterized in that queries matched with each user are merged and provided for the data server 2. Provision of the queries for the data server 2 requires a single transmission from a data supply controlling device. Thus, compared to an arrangement that each of queries matched with each user is provided for the data server 2 in separate transmissions, the present embodiment further improves communications efficiency and also reduce costs for users.

Moreover, if the query matched with the user is provided for the data server 2 in separate transmissions, the data server 2 has to conduct a search each time the server 2 receives a query. However, in the present embodiment, the server 2 only conducts a search when receiving the merged query. Hence a search in the data server 2 can be done efficiently.

Moreover, the user do not have to be accustomed to using the system etc., since:

data required for the data provision is registered in the search service center 3;

appropriate queries are generated automatically; and the results of the processes above are provided for the user.

Also, a search can be conducted efficiently, because another query which is registered as a search rule or a query registered by another user is diverted as a dummy query which is generated as a query.

Furthermore, when the data server 2 is instructed to conduct searches for multiple users, the data server 2 and the network can be utilized efficiently, because the search service center 3 provides a merged query and then instructs the search altogether.

Embodiment 2

The following description will describe an another embodiment of the present invention, referring to figures. By the way, arrangements identical to those in Embodiment 1 that have the same numbers and the descriptions are omitted.

Figure 13:
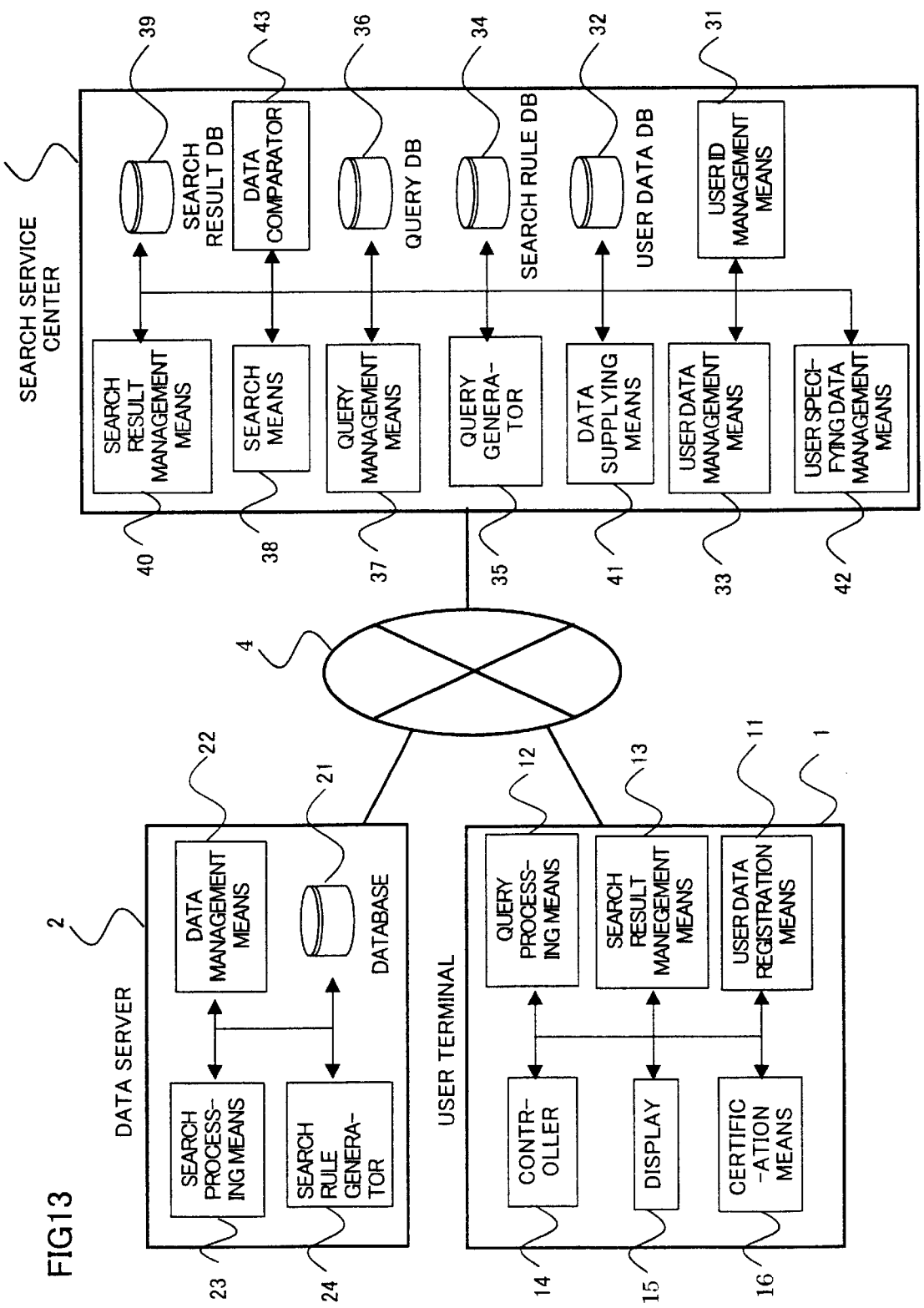
FIG. 13 is a block diagram in accordance with another embodiment of the present invention, showing an arrangement of a data supplying system.
Figure 14:
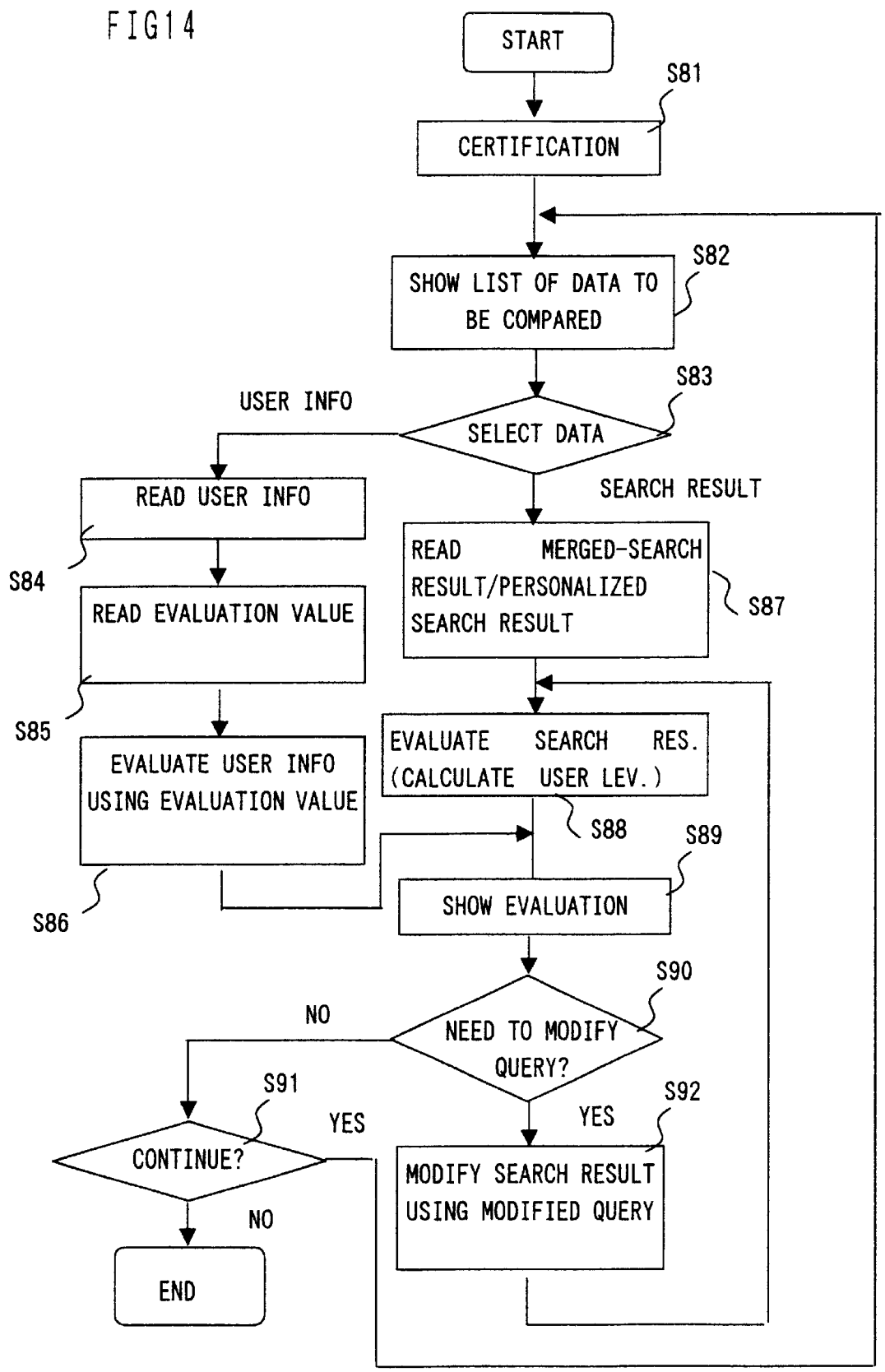
FIG. 14 is a flow chart showing how the data supplying system is operated.

FIG. 13 shows a general arrangement of a data supplying system in accordance with this embodiment. As the figure shows, the arrangement of this embodiment is identical to that of Embodiment 1, except a data comparator 43 is provided in a search service center 3. Following is a description of processes in this embodiment, based on a flow chart in FIG. 14.

After a user terminal 1 is connected to the search service center 3 via a network 4, if a process of data comparison is selected, first of all, the user is certified as an authorized user by the user terminal 1, by a certification procedure using a user ID and a certification number (S81). Then the data comparator 43 reads a list of data that can be compared to (will be referred to as data to be compared) from a search rule DB 34, and the data is shown in the user terminal 1 (S82).

Examples of the data to be compared are such as user data and a search result. Comparing user data means that, for instance, about books by a novelist, user possession data registered in a user data DB 32 and the number of currently published titles of the novelist are compared. Incidentally, a category (for instance literature, science, SF, foreign books, cartoon etc.) can substitute for the novelist.

Meanwhile, comparing search results means to compare the result searched for a merged query to the result matched with a user ID.

When the data to be compared is displayed in S82, the user selects data which the user wants to compare from the displayed data to be compared, and if another parameter such as a novelist or a category is required to be designated, the user designates it (S83).

If, for instance, a comparison of user data related to user possession data is selected and moreover a comparison of user possession data in relation to novelist A is designated in S82, the data comparator 43 reads novelist A-related user possession data of the user who instructs the data comparison, which is stored in the user data DB 32, via user data management means 33 (S84)

Then the data comparator 43 reads data to be compared to the user possession data read in S84, i.e. an evaluation value (described later) for comparing the user possession data to the number of currently published titles of novelist A, from the search rule DB 34 (S85). Then the data comparator 43 evaluates the user data, by comparing the user data of the user (user possession data) to the evaluation value (S86). By the way, the method to evaluate user data is described later.

If a comparison of search results is selected in S83, the data comparator 43 reads a merged-search result produced by a merged query which is stored in a search result DB 39, and also reads:

a search result that is produced by the merged-search result above and will be provided for the user who instructs the data comparison; or search results that have been provided for the user (a history of the search results) (S87).

Then the data comparator 43 compares the merged-search result to the search result matched with each user, and evaluates the search result that will be provided for the user or the search results that have been provided for the user, i.e. calculates a level of the search result (S88).

A level of the search result is, for instance, a total sum of evaluation values to which each set of data is assigned weight, considering an amount of data in a specified category and also generality, detailedness and difficulty level of a content of each set of data. So in accordance with this total sum, the evaluation values are represented as, for instance, an amateur level, a standard level and an expert level etc.

Especially, data of the type and field etc. of book such as magazines, books in general and specialized books are already encoded and managed in the case of books, so on the basis of this, it is possible to classify books. It is also possible to estimate generality, detailedness and difficulty of the contents of a book from the number of pages and price etc. Furthermore, data etc. in relation to a target book may be provided. This kind of data can be provided from the data server 2 to the search service center 3.

For instance, if book data classified in a category of personal computer, which is provided for the user, is restricted to book information of magazines and introductory books by an exclusive query etc., the level of the search result is represented as an amateur level. If the data provided for the user above contains explanatory books on an OS or software, the level of the search result is represented as a standard level, and if it contains information of specialized books about programming theories, the level of the search result is represented as an expert level. By the way, the search results that have been provided for the user are evaluated in the same manner.

Then data supplying means 41 registers the result of the evaluation that is done by the data comparator 43 in S86 or S88, in the user data DB 32, and also provides the result of the evaluation for the user terminal 1, in accordance with a data requirement of the user (S89). In this case, the result of the evaluation can be provided for the user terminal 1 in the same manner as that of the data provision requirement described in Embodiment 1 using the flow chart in FIG. 12. Then taking the provided result of the evaluation into account, the user selects whether to modify a query or not, as needs come up (S90).

At this point, if the target to be compared to is user data, the operation is moved to S91, since the modification of a query does not affect an evaluation of user data. The user selects whether the data comparison process is continued or not in S91. If the process is not continued, the operation is terminated, and if the process is continued, the operation is returned to S82 to conduct the same processes.

Meanwhile, if data to be compared is a search result, the user may need to reassess the query to get an appropriate search result again, depending on the evaluation shown in S89. In this case the modification of the query may be selected by the user in S91. In this case, for instance, a query generator 35 modifies an exclusive query, and data supplying means 41 modifies the search result provided for the user (S92).

Figure 15:
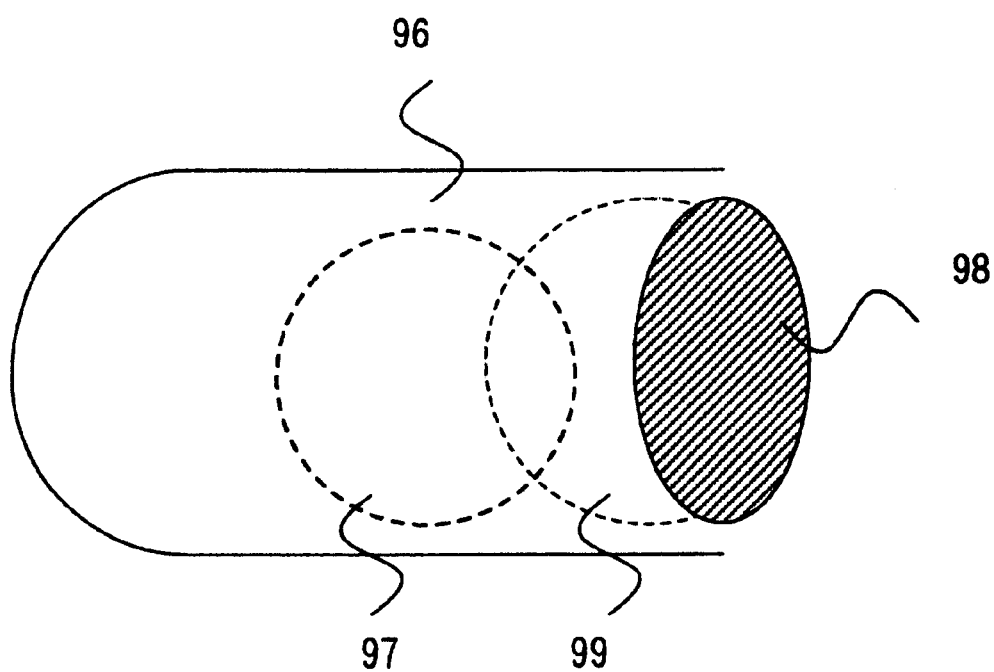
FIG. 15 is a general explanatory view showing how a search result is corrected on account of a correction of queries.

That is to say, as shown in FIG. 15, not-yet-modified search results 98 which are seen as in relatively low level poorly represent the whole merged search results 96, so it can be considered that the results 98 have no/few overlapping result/results with standard results 97. So, if the query generator 35 corrects, for instance, the exclusive query by excluding a keyword, a range of search results excluded from the merged search results 96 becomes narrower. On account of this, a post-correction search results 99 can cover wider range of search results than the not-yet-modified search results 98, and also the results 99 can be similar to or overlap with the standard results 97, slightly at least.

By the way, which keyword is excluded from the exclusive query may be designated, for instance, by the user, or by the data comparator 43 to get a search result at higher level, taking detailedness, a difficulty level, and generality as data into account.

After the modification of the search result in s 92, the evaluation can be confirmed by evaluating the search results again in S88.

As described above, by comparing search results as above, it becomes possible to evaluate that whether the search result provided for each user is appropriate for a specified set of data (novelist, category) or not, and also possible to modify the result in accordance with the evaluation.

Also, if a level of search results is an amateur level, the query generator 35 can modify an exclusive query to make the level of the search results to be, for instance, a standard level. If the level of search results is a standard level, the query generator 35 can modify a query to make the level of the search results, for instance, to be an expert level. In this manner, the user can certainly obtain search results that are at higher level than the not-yet-modified search results, owing to the modification of a query (exclusive query, for instance) in accordance with the level of search results.

Now, a method to evaluate user data is described.

First of all, a general description of the method is as follows:
  the evaluation value of each book judged by the contents etc. is registered in the search rule DB 34;
  a total point of each particular novelist or category is calculated in accordance with past search actions and the point is recorded; and
  to what extent the user has books in contradistinction to books and publications that are categorized in terms of already registered specific novelists and categories is evaluated, with the aid of the total point.

The following is more specific description of this.

TCa is given by eq. 2, $$TCa = \frac{Pa}{TPa} = \frac{\sum_{l=1}^{m} px(a, l)}{\sum_{k=1}^{n} ax(a, k)}$$

where a basic result of comparison TCa referring to item a (specific novelist or category, for instance) can be represented as a ratio of TPa and Pa, Pa being a sum of evaluation values px (a, l) that are assigned to m books owned by the user and belonging to a, and TPa being a sum of evaluation values ax (a, k) assigned to all n books belonging to a in accordance with importance and levels of the books.

By the way, k is positive integers 1 to n, and l is positive integers 1 to m.

Incidentally, although the evaluation values ax (a, k) and the evaluation values px (a, l) are treated as different variables, these two are identical for the same book.

Also, for instance, an evaluation value for a representative work of a novelist may be different from those of other works as weights are assigned, since of course possessing the representative work may be valued higher than possessing other works.

For instance, in the case of novel etc., the degree of reputation of a novel can be estimated from data such as received awards and reviews on the book, and the number of published copies. These kinds of data can be provided from the data server 2 to the search service center 3.

By the way, there are some books on technology (on electric circuit, for instance) and textbooks that can be seen as possessing equivalent level or contents. In this kind of case, if the user has a certain book on technology, the user may be seen as possessing other books on technology as well, even without actually other books that are in the same group as and having similar contents to the book above.

So, if some books can be seen as having equivalent contents or level, the equivalent books are registered in a single group, and if the user has any one book in the group, evaluation values px assigned to other books registered in the group are added to a sum of evaluation values Pa. On account of this, a knowledge level of the user in the field to which the book belongs can be judged by just whether possessing a book belonging to the group or not, regardless of the number of books in one's personal library.

Also, books related each other in terms of detailedness or a difficulty level can be treated similarly as above. In other words, if the user has a book on technology with a higher difficulty level, the user can be regarded as possessing a book on technology with a lower difficulty level as well, i.e. regarded as understanding the contents of the book, even if the user does not own the book with lower difficulty level.

Therefore, provided that:
  a correlation between multiple number of books in terms of detailedness and difficulty levels of the contents is registered; and
  a user owns highly detailed and/or difficult books, by adding evaluation values (px) of books possessing lower level than that of the books above (books subordinate to the books above) to a sum, Pa, of evaluation values, a knowledge level of the user in the field to which the book belongs can be judged regardless of the number of books in one's personal library, as is the case above.

The aforementioned equivalence and correlation between books can be determined through a procedure below, for instance. That is to say, based on statistics about the situation of data use etc. by each of the users who are equally ranked in terms of a specified category, it is possible to determine the equivalence and the correlation between books in consideration of a difference of frequency of the data use between the users and an inclusion relationship by data of the users at higher levels.

Also, accuracy of the data can be improved by carrying out surveys such as a questionnaire and voting.

These sorts of the statistical analysis and the surveys can be conducted in the data server 2 and the acquired data can be provided from the data server 2 to the search service center 3. Also, the analysis and the surveys can be conducted in the search service center 3. By the way, to improve accuracy of the data acquired from the surveys such as the questionnaire and voting, for instance, a person, looking after either the data server 2 or the search service center 3 that actually conducts the survey, can be involved with the planning of contents of the surveys.

Now, FIG. 16 shows a sample image displayed on a display 15 of the user terminal 1.

First, in a frame on the left side of the screen, the user selects what is compared, designates details of the contents in a box, and starts the process of comparison by clicking "enter". The figure shows a case that "category" was selected to be compared, and the user typed the word "personal computing" as the detail, to compare sets of data related to the category.

At the top right of the screen, a result of comparison that is worked out by a process of data comparison of the present embodiment is displayed in a form of a score (zz% in the figure). This score is indicated as a ratio of:
  an evaluation score xxx that is a sum of evaluation values of one's personal library related to "personal computing"; to
  an evaluation score yyy that is a sum of evaluation values of all books related to "personal computing".

Also, a knowledge level of the user's books derived from contents and correlations of his/her books as described above is shown as level N. In this example, the knowledge level is separated into grades, for instance, H (high), N (normal) and L (low), based on the score above. The knowledge level in this example is normal.

What are displayed in the left side of an area immediately below the score are:
  a breakdown of the evaluation score xxx in relation to books owned by the user; and
  a list of books that are not owned by the user but the scores are added to, since the contents are similar or equivalent to the books that the user owns.

The example shows that although the user does not own books A1 and B12, evaluation scores of the books A1 and B12 are added to, since the user owns books A2 and B11 in correlation with the books above.

Moreover, in the right side of the area immediately below the score, a breakdown of not-yet-owned books among books related to "personal computing" is listed in descending order of evaluation scores. The division of a breakdown of information of books as supplementary information enables the user immediately to acquire information about books that the user is required to read in the future, and also enables the user to realize more efficient reading. In addition, providing such supplementary information improves user's knowledge level in the selected field.

In this manner, in the present embodiment, each evaluation value of data, which is searched for in accordance with user data stored in the user data DB 32, is stored in the search rule DB (evaluation value recording means) 34, then based on the sum of the evaluation values above and the sum of evaluation values matched with the user data above, the data comparator (user data evaluation means) 43 evaluates the user data. On account of this, it becomes possible to judge a knowledge level of the user who is matched with the user data, in the data that is a target to be compared.

Moreover, the aforementioned data comparator (search result comparing means) 43 compares search results stored in the search result DB 39 and a search result matched with each user, and judges a level of the search result. This enables to judge effectiveness of a search result provided for each user.

By the way, the operations described in the embodiments above can be realized by a computer program. The program is stored in a computer-readable storage medium. In the present invention, this storage medium may be a memory (not illustrated), for instance ROM itself, that is required when the search service center 3 operates, or may be a program storage medium that is readable by inserting into a program reader provided as an external storage device (not illustrated).

In both cases, the stored program may be arranged to be executed by an access of a microprocessor (not illustrated), or arranged so that the program is executed by reading the stored program and then downloading the read program to a program storage area (not illustrated) of a delivery server and a receiving server. In this case, a program for downloading is stored in the main device in advance.

The program storage medium may be a storage medium that can be separated from the main device, and may be a medium that stores a program permanently, including tapes (magnetic tape, cassette tape etc.), magnetic discs (floppy disk, hard disk etc.), optical disks (CD-ROM, MO, MD, DVD etc.), cards (IC card (including memory card), optical card etc.), and semiconductor memories (mask ROM, EPROM, EEPROM, flash ROM etc.).

Also, the program storage medium may be a medium that stores a program temporarily, for a purpose of downloading the program from a communications network, since the system of the present embodiment is arranged to be connectable to communications networks including the Internet. By the way, in the case of downloading the program from a communications network, the program for downloading may be stored in the main device in advance, or may be installed from another storage medium.

Contents stored in the storage medium are not limited to a program but may be data as well.

Although the description above described the system in which search processing means 23 is provided in the data server 2 and the data server 2 is equipped with a function of an information search, search means 38 of the search service center 3 may have the function of the search processing means 23, i.e. the function of an information search. In this case, data matched with a type of information provided for the user, stored in a database 21 of the data server 2 is sent to the search service center 3, and based on a query generated by the query generator 35, an information search is conducted by the search means 38. The same effects as that of the present embodiment can be acquired from this embodiment.

Incidentally, Japanese Examined Patent Publication No. 2976219 discloses that user data is recorded, for instance, in a storage medium such as IC memory, and the user data stored in the storage media above is read by a terminal of the user when a search for commercial information is conducted, and then a host computer conducts an information search by picking up only required data from the user data. However, the invention above and the present invention are different in that while the invention above stores user data in a storage medium, the present invention only stores user specifying data (data which can specify each user, such as name and address) in a storage medium.

In the present invention, user data only matched with identifying data (correlation between identifying data and a removable storage medium is recorded only in the storage medium above) can be perpetually utilized in the search service center 3. Also, queries are not generated every time an information search is conducted but queries registered in databases in advance are used. On account of this, when information is provided for the user, a connecting time for information provision via communications means is reduced, since it becomes unnecessary to take time to generate queries and total required time to search for information is reduced. However, a time to extract a search result from a merged query is needed.

A data supply controlling means in accordance with the present invention can be arranged to further include user specifying data management means for managing the user specifying data in such a manner that no access can be made to the user specifying data over a communications network.

According to the arrangement above, for instance, being stored in a storage medium that is removable from the main device such as IC memory, the user specifying data is managed by the user specifying data management means in such a manner that no access can be made to the user specifying data over a communications network. On account of this, a leakage of the user specifying data in the process of communications can be certainly prevented.

The data supply controlling means in accordance with the present invention can be arranged to further include query management means for merging and managing a query for each user generated by the query generating means, so as to supply a merged query to a data supplying device.

According to the arrangement above, queries matched with the users generated by the query generating means are merged by the query management means. For instance, if queries include the same keyword, the queries are merged into one query. In this manner, the merged query is provided for the data supplying device by the query management means. Hence the data supplying device uses the merged query for searching information.

In this manner, the provision of a query to the data supplying device requires a single communications from the data supply controlling device. So communications efficiency is improved, comparing to an arrangement that non-merged queries matched with each user are provided for the data supplying device in separate transmissions.

The data supply controlling device in accordance with the present invention can be arranged to further include user data management means for encrypting and managing the user data in relation to matched identifying data.

According to the arrangement above, user data becomes certainly protected and impossible to be decrypted even if the user data is leaked out of the device, since the user data management means encrypts and manages the user data in accordance with matched identifying data.

The data supply controlling device in accordance with the present invention can be arranged so that the query generating means generates, as the query, a first query to include information necessary to the user in a search result and a second query to conceal the first query, both for supply to the data supplying device.

According to the arrangement above, it is difficult to specify information that the user really requires, even if the search result produced by the data supplying device in accordance with the first and second queries is leaked out of the device, since the second query conceals the first query that provides required information for the user. Hence privacy of the user in relation to the search result can be protected.

The data supply controlling device in accordance with the present invention can be arranged so that the first query is composed of a base query to include information matched with the user data in a search result, an additional query to include information excluded by the base query in an information search in the search result, and an exclusive query to exclude each piece of poorly related information from the search result.

According to the arrangement above, information that the user requires can be provided with certainty by generating a query that can certainly search for information in relation to the user thanks to the inclusion of the base query, the additional query, and the exclusive query in the first query.

The data supply controlling device in accordance with the present invention can be arranged so that the second query is a dummy query to include information unnecessary to the user in the search result.

According to the arrangement above, the search results can include results that are poorly related to the user because the search by the data supplying device is conducted in accordance with the first query and the second query which is a dummy query that are sent to the data supplying device altogether. Hence even if the search result is leaked out of the device, privacy of the user in relation to the search result can be protected with certainty, since it becomes extremely difficult to specify information that the user really needs.

The data supply controlling device in accordance with the present invention can be arranged so that:
  the query generating means generates a filtering query to filter out a search result derived from the dummy query from search results stored in the search result storage means; and
  the data supplying means supplies the search result not to be filtered out to the user terminal from the search result storage means.

According to the arrangement above, unnecessary search results matched with the dummy query are filtered out by the filtering query, then the consequence is provided for the user terminal. On account of this, while concealing the first query by the dummy query, only information that the user really requires can be supplied for the user in the end.

The data supply controlling device in accordance with the present invention can be arranged so that the data supplying means supplies a search result suitable to each user to the user terminal in response to a data supply request sent from the user through the user terminal.

According to the arrangement above, the data supplying means can supply a search result suitable to each user to the user terminal only when, for instance, a data supply request is sent from the user through the user terminal. So privacy protection can be further accomplished, since it becomes unnecessary to send a search result to the user terminal when the user does not require so that an opportunity of a leakage of a search result in the process of communications etc. is minimized.

The data supply controlling device in accordance with the present invention can be arranged to include search rule storage means for storing a search rule specifying a rule by which the query generating means generates a query in accordance with kinds of information to be searched for, wherein:

the query generating means generates a query based on the user data and the search rule.

According to the arrangement above, the query generating means generates a query matched with types of information to be searched for, based on a search rule stored in the search rule storage means in addition to the user data. So this enables the data supplying device appropriately to search for information in accordance with types of information to be searched for in relation to the query and information matched with user data. As a result, information (search result) that the user really need can be acquired with certainty.

The data supply controlling device in accordance with the present invention can be arranged so that the search rule stored in the search rule storage means is supplied from the data supplying device and is updated upon every supply.

According to the arrangement above, the search rule supplied from the data supplying device is stored in the search rule storage means. Also, the search rule stored in the search rule storage means is updated upon every supply of the search rule from the data supplying device. On account of this, the query generating means can recognize which search rule should be selected to generate a query that makes an appropriate data supplying device search for information. Hence even if there are more than one data supplying device in accordance with types of information to be provided, an information search matched with the search rule can certainly be done in a specified data supplying device that provides the search rule.

The data supply controlling device in accordance with the present invention can be arranged to include:

evaluation value storage means for storing an evaluation value for each piece of information to be searched for in accordance with the user data; and user data evaluation means for evaluating the user data based on a sum of all the evaluation values and a sum of the evaluation values matched with the user data.

Provided that books by novelist A owned by the user is the user data and all books by novelist A registered in data supplying device is data to be searched for in accordance with the user data, the evaluation value storage means stores an evaluation value for each piece of information of all books by novelist A. Then the user data evaluation means evaluates the user data based on a sum of the evaluation values of those books and a sum of the evaluation values matched with the books owned by the user. On account of this, a knowledge level of the user matched with the user data, about the information to be compared (in this case novelist A) can be judged.

The data supply controlling device in accordance with the present invention can be arranged to include search result comparing means for comparing the search result stored in the search result storage means with a search result suitable to the user, so as to determine a level of the search result suitable to the user.

According to the arrangement above, compared to the search result stored in the search result storage means, a level of the search result suitable to the user that is stored in the search result storage means can be judged by the search result comparing means. Examples of the level of the search result are such as an amateur level, a standard level and an expert level, and the level is comprehensively determined in consideration of, for instance, detailedness, a level of difficulty, and generality of the search result with a certain degree of weights assigned. So referring to the level of the search result, the user can easily judge whether a search in a higher level is required to be done or not, i.e. whether the query should be reassessed or not. In other words, this enables to judge effectiveness of the search result provided for each user easily.

The data supply controlling device in accordance with the present invention can be arranged so that the query generating means can correct the query in accordance with the level of the search result.

According to the arrangement above, provided that the level of the search result determined by the search result comparing means is, for instance, an amateur level, the query generating means modifies the query (exclusive query, for instance) to make the search result have, for instance, a standard level. Also, provided that the level of the search result determined by the search result comparing means is, for instance, a standard level, the query generating means modifies the query to make the search result have, for instance, an expert level. In this manner, the modification of the query in accordance with the level of the search result by the query generating means enables the user to acquire a search result in a higher level than that before the modification.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A data supply controlling device, comprising:

user data storage means for storing user data for each user who is to be supplied with information through a user terminal;

query generating means for generating, based on at least the user data, a query for a data supplying device to search for the information;

search result storage means for storing a result of a search conducted by the data supplying device for the information in accordance with the query;

identifying data management means for managing identifying data by which each user can be identified, separately from user specifying data by which each user can be specified; and data supplying means for generating a search result matched with the identifying data of the user from the search result stored in the search result storage means for supply to the user terminal.

2. The data supply controlling device as set forth in claim 1, further comprising
user specifying data management means for managing the user specifying data in such a manner that no access can be made to the user specifying data over a communications network.

3. The data supply controlling device as set forth in claim 1, wherein
the user specifying data is at least one item selected from the group consisting of a name, an address, and an Internet Protocol address of the user.

4. The data supply controlling device as set forth in claim 1, wherein
the identifying data includes a user ID and a certification number.

5. The data supply controlling device as set forth in claim 1, further comprising
query management means for merging and managing the query for each user generated by the query generating means, so as to supply the merged query to the data supplying device.

6. The data supply controlling device as set forth in claim 5, wherein
the query management means merges the query by combining queries sharing an identical keyword to a single query.

7. The data supply controlling device as set forth in claim 5, wherein
the query management means merges the query by deleting a query included in another query.

8. The data supply controlling device as set forth in claim 5, wherein
the data supplying means extracts a search result matched with the identifying data of the user from a search result derived based on the query merged by the query management means for supply to the user terminal.

9. The data supply controlling device as set forth in claim 1, further comprising
user data management means for encrypting and managing the user data in relation to matched identifying data.

10. The data supply controlling device as set forth in claim 1, wherein
the query generating means generates, as the query, a first query to include information necessary to the user in a search result and a second query to conceal the first query, both for supply to the data supplying device.

11. The data supply controlling device as set forth in claim 10, wherein
the first query is composed of a base query to include information matched with the user data in a search result, an additional query to include information excluded by the base query in an information search in the search result, and an exclusive query to exclude each piece of poorly related information from the search result.

12. The data supply controlling device as set forth in claim 10, wherein
the second query is a dummy query to include information unnecessary to the user in the search result.

13. The data supply controlling device as set forth in claim 12, wherein:
the query generating means generates a filtering query to filter out a search result derived from the dummy query from a search result stored in the search result storage means; and
the data supplying means supplies the search result not to be filtered out to the user terminal.

14. The data supply controlling device as set forth in claim 1, wherein
the query generating means calculates an evaluation value E for each of m queries by dividing a sum of L evaluation values which represent evaluation by the user on L past search results by L.

15. The data supply controlling device as set forth in claim 14, wherein
the query generating means employs one of the queries with a high evaluation value E as a base query to include information matched with the user data in a search result.

16. The data supply controlling device as set forth in claim 15, wherein
the query generating means calculates the evaluation value E and selects the base query periodically for each of the m queries.

17. The data supply controlling device as set forth in claim 1, wherein
the data supplying means supplies a search result suitable to each user to the user terminal in response to a data supply request sent from the user through the user terminal.

18. The data supply controlling device as set forth in claim 1, further comprising
search rule storage means for storing a search rule specifying a rule by which the query generating means generates a query in accordance with kinds of information to be searched for,
wherein
the query generating means generates a query based on the user data and the search rule.

19. The data supply controlling device as set forth in claim 18, wherein
the search rule stored in the search rule storage means is supplied from the data supplying device and is updated upon every supply.

20. The data supply controlling device as set forth in claim 1, further comprising:
evaluation value storage means for storing an evaluation value for each piece of information to be searched for in accordance with the user data; and
user data evaluation means for evaluating the user data based on a sum of all the evaluation values and a sum of the evaluation values matched with the user data.

21. The data supply controlling device as set forth in claim 20, wherein
the user data evaluation means evaluates the user data by determining a knowledge level of the user about information to be searched for.

22. The data supply controlling device as set forth in claim 20, wherein:
the user data indicates a degree of ownership of goods given by the information to be searched for by the user; and
the user data evaluation means evaluates the user data by determining an ownership ratio of the goods by the user.

23. The data supply controlling device as set forth in claim 22, wherein
the user data evaluation means evaluates the user data by determining the ownership ratio by the user by giving different weights to different kinds of goods.

24. The data supply controlling device as set forth in claim 22, wherein the user data evaluation means evaluates the user data by giving a high mark to the user data if TCa=Pa/TPa is high, where TPa is a sum of evaluation values ax(a, k) (k=1, 2, ..., n) given to n items of goods belonging to a category a, and Pa is a sum of evaluation values px(a, L) (L=1, 2, ..., m) given to m items of the goods belonging to the category a and owned by the user.

25. The data supply controlling device as set forth in claim 22, wherein the goods are books.

26. The data supply controlling device as set forth in claim 1, further comprising search result comparing means for comparing the search result stored in the search result storage means with a search result suitable to the user, so as to determine a level of the search result suitable to the user.

27. The data supply controlling device as set forth in claim 26, further comprising query management means for merging and managing the query generated for each user by the query generating means, for supply to the data supplying device, wherein the search result comparing means uses a result of a search conducted based on the merged query as the search result stored in the search result storage means for use in a comparison with a search result suitable to each user.

28. The data supply controlling device as set forth in claim 26, wherein the level is selected from multiple levels of expertise.

29. The data supply controlling device as set forth in claim 28, wherein the multiple levels include an "amateur" level, a "standard" level, and an "expert" level in ascending order to expertise.

30. The data supply controlling device as set forth in claim 26, wherein the query generating means corrects the query in accordance with the level of the search result.

31. The data supply controlling device as set forth in claim 30, wherein the level is selected from multiple levels of expertise; and the query generating means corrects the query so that the selected level is changeable from one to another among the multiple levels.

32. The data supply controlling device as set forth in claim 31, wherein the query generating means corrects the query so that the selected level is changeable to a higher level of expertise among the multiple levels.

33. A data supply system, comprising:

a data supply controlling device including: user data storage means for storing user data for each user who is to be supplied with information through a user terminal; query generating means for generating, based on at least the user data, a query for a data supplying device to search for the information; search result storage means for storing a result of a search conducted by the data supplying device for the information in accordance with the query; identifying data management means for managing identifying data by which each user can be identified, separately from user specifying data by which each user can be specified; and data supplying means for generating a search result matched with the identifying data of the user from the search result stored in the search result storage means for supply to the user terminal;

a data supplying device for conducting a search for the information in accordance with a query given by the data supply controlling device to provide a search result to the data supply controlling device; and a user terminal for receiving a search result suitable to each user from the data supply controlling device, the data supply controlling device, the data supplying device, and the user terminal being interconnected through a communications network.

34. A data supply controlling device, comprising:

user data storage means for storing user data for each user who is to be supplied with information through a user terminal;

query generating means for generating, based on at least the user data, a query to search data supplied from a data supplying device;

search means for searching for the information in accordance with the query;

search result storage means for storing a result of a search conducted by the search means;

identifying data management means for managing identifying data by which each user can be identified, separately from user specifying data by which each user can be specified; and data supplying means for generating a search result matched with the identifying data of the user from the search result stored in the search result storage means for supply to the user terminal.

35. A data supply system, comprising:

a data supply controlling device including: user data storage means for storing user data for each user who is to be supplied with information through a user terminal; query generating means for generating, based on at least the user data, a query to search data supplied from a data supplying device; search means for searching for the information in accordance with the query; search result storage means for storing a result of a search conducted by the search means; identifying data management means for managing identifying data by which each user can be identified, separately from user specifying data by which each user can be specified; and data supplying means for generating a search result matched with the identifying data of the user from the search result stored in the search result storage means for supply to the user terminal;

a data supplying device for supplying, to the data supply controlling device, data to be searched by the data supply controlling device; and a user terminal for receiving a search result suitable to each user from the data supply controlling device, the data supply controlling device, the data supplying device, and the user terminal being interconnected through a communications network.

36. A method of supplying data, comprising the steps of:

storing, in user data storage means, user data for each user who is to be supplied with information through a user terminal;

generating, based on at least the user data, a query for a data supplying device to search for the information;

storing, in search result storage means, a result of a search conducted by the data supplying device for the information in accordance with the query;

registering, in identifying data management means, identifying data by which each user can be identified, separately from user specifying data by which each user can be specified; and generating a search result matched with the identifying data of the user from the search result stored in the search result storage means for supply to the user terminal.

37. A method of supplying data, comprising the steps of:

storing, in user data storage means, user data for each user who is to be supplied with information through a user terminal;

generating, based on at least the user data, a query to search data supplied from a data supplying device;

searching for information in accordance with the query;

storing a search result in search result storage means;

registering, in identifying data management means, identifying data by which each user can be identified, separately from user specifying data by which each user can be specified; and generating a search result matched with the identifying data of the user from the search result stored in the search result storage means for supply to the user terminal.

38. A storage medium for storing a data supply program executed by a computer to implement a method of supplying data, the method comprising the steps of:

storing, in user data storage means, user data for each user who is to be supplied with information through a user terminal;

generating, based on at least the user data, a query for a data supplying device to search for the information;

storing, in search result storage means, a result of a search conducted by the data supplying device for the information in accordance with the query;

registering, in identifying data management means, identifying data by which each user can be identified, separately from user specifying data by which each user can be specified; and generating a search result matched with the identifying data of the user from the search result stored in the search result storage means for supply to the user terminal.

39. A storage medium for storing a data supply program executed by a computer to implement a method of supplying data, the method comprising the steps of:

storing, in user data storage means, user data for each user who is to be supplied with information through a user terminal;

generating, based on at least the user data, a query to search data supplied from a data supplying device;

searching for information in accordance with the query;

storing a search result in search result storage means;

registering, in identifying data management means, identifying data by which each user can be identified, separately from user specifying data by which each user can be specified; and generating a search result matched with the identifying data of the user from the search result stored in the search result storage means for supply to the user terminal.

* * * * *